United States Patent
Pepper

(10) Patent No.: US 12,455,196 B2
(45) Date of Patent: Oct. 28, 2025

(54) CONFORMAL IMAGING VIBROMETER USING ADAPTIVE OPTICS WITH SCENE-BASED WAVE-FRONT SENSING

(71) Applicant: David Mort Pepper, Camarillo, CA (US)

(72) Inventor: David Mort Pepper, Camarillo, CA (US)

( * ) Notice: Subject to any disclaimer, the term of this patent is extended or adjusted under 35 U.S.C. 154(b) by 887 days.

(21) Appl. No.: 17/544,877

(22) Filed: Dec. 8, 2021

(65) Prior Publication Data

US 2023/0175893 A1    Jun. 8, 2023

(51) Int. Cl.
*G01J 9/04* (2006.01)
*G01J 9/02* (2006.01)

(52) U.S. Cl.
CPC . *G01J 9/04* (2013.01); *G01J 9/02* (2013.01); *G01J 2009/0249* (2013.01); *G01J 2009/0269* (2013.01)

(58) Field of Classification Search
CPC ........ G01J 9/04; G01J 9/02; G01J 2009/0249; G01J 2009/0269; G01J 2009/002; G01J 9/00; G01H 9/00; G01H 9/002
See application file for complete search history.

(56) References Cited

U.S. PATENT DOCUMENTS

| | | | |
|---|---|---|---|
| 4,833,314 A | 5/1989 | Pepper et al. | |
| 7,116,426 B2 | 10/2006 | Lal et al. | |
| 7,193,720 B2 | 3/2007 | Gatt | |
| 7,617,060 B1 | 11/2009 | Rauch et al. | |
| 7,961,362 B2 | 6/2011 | Xu | |
| 8,446,575 B1 | 5/2013 | Reu et al. | |
| 8,995,787 B2 | 3/2015 | Poyneer et al. | |
| 9,829,374 B2 | 11/2017 | Kilpatrick et al. | |
| 10,228,277 B1 | 3/2019 | Land et al. | |
| 10,976,239 B1 | 4/2021 | Hart et al. | |
| 12,080,986 B2 * | 9/2024 | Pepper | H01S 3/08 |
| 2016/0178345 A1 * | 6/2016 | Kilpatrick | G01B 11/14 |
| | | | 356/482 |
| 2020/0351454 A1 * | 11/2020 | Wu | G01J 9/00 |
| 2021/0076944 A1 | 3/2021 | Anthony et al. | |
| 2023/0216266 A1 * | 7/2023 | Pepper | H01S 3/1109 |
| | | | 372/99 |

OTHER PUBLICATIONS

Rukosuev et al, Adaptive Optics System for Real-Time Wavefront Correction, Moscow State University, Mechanical Engineering (MAMI) ISSN 1024-8560, Atmospheric and Oceanic Optics, 2015, vol. 28, No. 4, pp. 381-386. Pleiades Publishing, Ltd., 2015. (Year: 2015).*

* cited by examiner

*Primary Examiner* — Uzma Alam

(57) ABSTRACT

Conformal imaging vibrometer using adaptive optics with scene-based wave front sensing. An extended object is located at the first end of a link, and a reference-free, adaptive optical, conformal imaging vibrometer using scene-based wave front sensing is located at the second end of the link. An aberrated, free space or guided-wave path exists between the ends of the link. The adaptive optical system compensates for path distortions. Using a single interrogation beam, whole-body vibrations of opaque and reflective objects can be probed, as well as transparent and translucent objects, the latter pair employing a Zernike heterodyne interferometer.

9 Claims, 11 Drawing Sheets

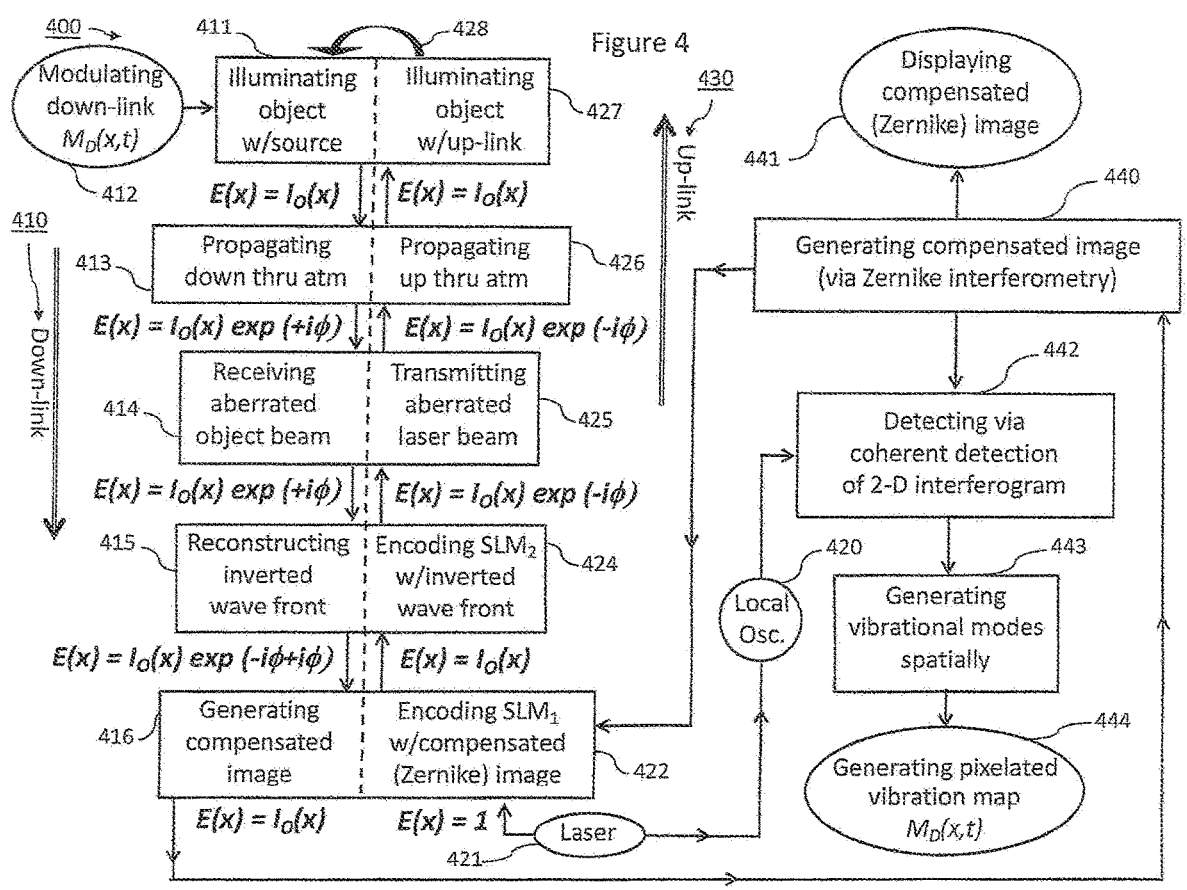

CONFORMAL IMAGING VIBROMETER USING ADAPTIVE OPTICS WITH SCENE-BASED WAVE-FRONT SENSING

FIELD OF THE INVENTION

The present invention relates to vibrometry and to adaptive optics and, more specifically, it relates to a reference-free vibrometer that functions over a turbulent path that utilizes scene-based wave front sensing of an object to generate the required adaptive optical wave front correction information to realize diffraction-limited imaging and diffraction-limited illumination of an object. A compensated conformal-imaging vibrometer over an extended object can be realized with a single probe beam.

BACKGROUND ART

The background art, which is reviewed below, pertains to reference-free, adaptive optics, compensated imaging, scene-based wave front correction, Zernike interferometry and conformal laser Doppler vibrometry. This art may be of interest to the reader when reviewing this description of the present technology.

The basic elements of a typical (prior art) down-link adaptive optics communications system 100 are shown in FIG. 1A. The goal of such systems is to provide real-time compensation for propagation errors, as encountered by optical beams, as they propagate through dynamic distorting paths, including turbulent atmospheres, optical pointing errors, imperfect optical elements, multi-mode optical fibers, etc.

By compensating for optical wave front distortions, one can enhance the performance of a variety of optical systems. Examples include optical communication systems, remote sensors, precision laser-beam delivery systems for industrial and medical purposes, and compensated imaging systems such as in medical applications (ophthalmological imaging and precision surgical procedures through the eye), microscopy, and compensated imaging systems. In the latter example, this implies that one can view complex objects over a distorted path with the same image quality as if the path were distortion-free. In this case, the performance of the imaging system can approach that of its theoretical diffraction limit, within the so-called isoplanatic volume.

In what follows, first discussed is a generic adaptive optical system capable of correcting for path distortions encountered by a so-called diffraction-limited reference beam. The reference beam is typically an image-free optical source, whose function is to sample the path distortions and, thus, provide this wave front information as input to the adaptive optical system.

This discussion is followed by a description of a specific adaptive optical configuration typical of prior-art, including an example of a wave front-error sensing device. This, in turn, is followed by a discussion of an optical compensated imaging system typical of the art. An understanding of these known art systems will provide perspective with regard to the exemplary embodiments of this invention that follow.

As discussed below, compensation of wave front phase errors enables a system to provide diffraction-limited imaging and viewing of an extended object. In general, one first samples and compensates for propagation-path errors using a diffraction-limited reference beam (e.g., a laser or guide star). Upon compensation of wave front errors encountered by the reference beam, the optical system can approach its theoretical diffraction-limited imaging capability of image-bearing beams that lie within the so-called isoplanatic patch, which is well known in the art. As discussed in the exemplary embodiments below, this invention enables one to obtain near-diffraction-limited imaging without the need for a reference beam, with application to optical vibrometry.

Turning now to FIG. 1A, the goal of the prior-art system is to enable one to communicate light from an optical source 110 with diffraction-limited capability through a path distortion. In this case, the optical source is chosen to be of spatial extent less than, or equal to, the diffraction limit of the optical system. Therefore, this source is equivalent to a point object with zero image-bearing information, analogous to a single pixel of an image, otherwise known in the art as a "glint." Light that emerges from this object, which is referred heretofore as a "point-source" or "reference beam," 120, propagates through space, and, in general, becomes aberrated, as depicted by wave front 120, as a result of the intervening path distortions or spatial phase errors, such as atmospheric turbulence, labeled by a spatially and temporally dynamic phase error PHI. It is to be understood that in the present invention, PHI is a function of space and time, that is, PHI=PHI(x,t). In essence, the reference beam 120 samples the propagation-path distortions between it and the optical compensation system, 100, including distortions imposed by optical elements within the compensation system itself.

At the receiver end of the down-link, a fraction of reference beam 120 is collected by telescope 130, which represents the input optical imaging elements of the adaptive optical receiver system 100. The collected light forms an image at the camera, or detector array, 190. In the absence of path distortions, the image at the camera plane would be in the form of an Airy disc, since the reference beam 120 is a sub-diffraction-limited point source, that is, a single pixel. However, owing to optical propagation phase distortions, PHI, encountered by the reference beam on its path toward the receiver 110, the wave fronts of this beam will be aberrated, resulting in a distorted image of an Airy disc pattern at camera 190. As is known in the art, the path distortions in this scenario can stem from atmospheric turbulence, pointing and tracking errors, imperfect optical elements, thermal and mechanical perturbations, among other effects. The goal, therefore, of the adaptive optical system 100 is to compensate for such path errors so that the wave front of the reference beam at detector 190 can approach the diffraction limit.

Returning to FIG. 1A, the reference beam exiting the telescope (or microscope) 130 will be aberrated by virtue of the deleterious path distortions, as represented by wave front 140. In this example, the adaptive optical system consists of two optical correction elements. The first corrective element 150 is a so-called tip-tilt compensator, whose function is to compensate for overall beam pointing and tracking errors. The second corrective element 160 is a spatial phase modulator, whose function is to compensate for fine-scale optical wave front phase errors, including focus errors and spatially complex wave front errors. The latter can include static and/or dynamic errors resulting from atmospheric turbulence, surface and volume refractive-index irregularities of optical elements. Wave front compensation element 160 can be in the form of arrays of continuous and/or discrete optical phase shifters, such as piezoelectric transducers, electro-optic elements, deformable membranes, MEMS mirrors, liquid crystal cells, photonic crystals, metasurfaces, among other devices, as is known in the art.

The incident distorted beam 140, first encounters the tip-tilt optical component 150 followed by the spatial phase modulator 160. The beam subsequently strikes a beam splitter 165, with one output beam directed to an optical wave front error sensor 170, and with the other output beam directed to the camera/detector 190.

The telescope 130 provides an image of the incident beam at the camera plane 190, and, furthermore, provides an image of the pupil plane at the surface of the wave front corrective element 160. Hence, the wave front at the incident aperture is replicated, and, scaled, as needed, at the plane of 160. As is known in the art, the number of phase-controllable elements across the aperture of 160 is determined, in part, by the so-called transverse coherence parameters, otherwise known as the Fried parameters, which is characteristic of the scale size of the turbulent atmosphere.

The spatial bandwidth of the phase modulator 160 is designed to accommodate the spatial bandwidth indicative of the wave front distortions, 120, subject to Nyquist constraints, as is known in the art. In image compensation systems (discussed with respect to FIG. 2A below), the spatial bandwidth requirements for the corrective element are the same, in terms of resolving the wave front error distortions sampled by the reference beam. The imaging resolution, on the other hand, is dictated by the diffraction limit of the overall optical system. In most cases, the Fried parameter scale size of the turbulence is far greater than that of the pixel size required to faithfully image the object. In other words, the object is comprised of far more pixels (order 10,000 to 1,000,000) than can be described of the distorting medium (order 100 to 1000).

Each of the compensation elements 150 and 160 is controlled and configured in real-time using various classes of optical detectors, algorithms and electronic networks, examples of which are feedback, feed-forward and multi-dither systems, as is known in the art. One example of an optical feedback control loop is depicted in FIG. 1A. It consists of a wave front error sensor 170, a processor module 177, and a pair of electronic drivers 180 and 185 that provide control signals to the tip-tilt compensator 150 and the spatial phase modulator 160, respectively. Ideally, the driver 185 will generate a spatial phase map indicative of a wave front-reversed replica, whose phase is given by –PHI. The resultant beam will therefore possess a wave front that is a combination of the incident phase distortion, +PHI, and the correction phase map, –PHI, resulting in a wave front with a net phase given as PHI+(–PHI)=0, indicative of an aberration-free reference beam.

The optical feedback control system is designed to drive the wave front error 140 to a minimum. Upon convergence of the servo control configuration, the resultant reference beam that strikes the camera/detector 190 will be, ideally, free of wave front errors. In this state, the overall optical receiver system 100 will provide an image of the point-source, reference beam source 110, to its diffraction limit, that is, a planar wave front. Given that this system functions in real-time, dynamic path distortions can be tracked and compensated, with a residual error determined by the servo-loop gain and its bandwidth, as known in the art. In general, one can impose temporal modulation onto the reference glint to realize a down-link communications signal.

It is to be appreciated that, in the down-link system of the prior art, a glint provides the reference. That is, a single-pixel reference is utilized in the prior art. Therefore, it is completely counter to the prior art reference requirements, and is not obvious or anticipated, to replace the glint (point source) with a whole object, the latter resulting in an effective "image-bearing reference," to be discussed below with respect to FIG. 3A.

To the contrary, in the prior art, much effort is expended to assure that the reference has zero spatial information; in the prior it is a plane wave (zero spatial information). To deviate from a glint to a reference with spatial information, would render the prior art system useless.

Turning now to FIG. 1B, a compensated up-link communication system is depicted in 101. The architecture is identical to that of the down-link, subject to the following differences. One key difference is that a plane-wave laser communications source, 175, is shown, whose function is to direct a laser beam back towards the reference glint location. That is, the point-source reference beam and the point-source laser communications beam are counter-propagating with respect to each other. The laser is assumed to generate a diffraction-limited output beam, whose wave fronts are planar, 176. That is, this laser source is not encoded with any spatial information. Hence, this laser is ideally, a single pixel source without any spatial amplitude modulation; that is, a uniform intensity source.

In fact, in the existing art, if the return beam is encoded with any spatial information beyond a plane wave, the system will be rendered useless, since a diffraction-limited beam will not form at the location of the glint. Hence, in both the down-link and up-link prior-art systems, a plane wave is assumed for both ends of the link, in order for the prior-art systems to function as described.

As will become apparent with respect to this invention, and to be described with respect to the embodiments shown below, the laser can be encoded with spatial amplitude and phase information of an extended object, which described in the more recent art, FIG. 3.

Returning to FIG. 1B, laser beam 176 is directed via beam splitter 177 back toward the glint. Note that the feedback servo-system of FIG. 1A is not affected by the communications laser source 175. Instead, this plane wave 176 is encoded via the spatial phase modulator, 160, and tip-tilt compensator, 150, with an inverted wave front, resulting in a spatial phase, –PHI. This wave front inverted beam is then directed in a reverse direction with respect to the down-link reference back through the same telescope (or microscope). Upon propagating back through the same path distortion as the incident reference beam, a spatial phase shift, –PHI, is encountered by the path distortion, resulting in a net phase error of +PHI+(–PHI)=0. Hence, the up-link beam forms back on the glint as a diffraction limited beam. This reverse-propagating laser can be amplified (amplifier not shown), as is known in the art, resulting in a directed energy beam incident onto the glint location, with application to manu-facturing and medical applications, among others. More-over, the laser, 175, can be temporally modulated to realize an up-link communications signal, forming a simplex or duplex communications link.

In the case of a duplex communications system, the down-link of FIG. 1A and the up-link of FIG. 1B can occur essentially simultaneously, with a temporal separation less than the time constant of the aberration. Hence, light from the glint 110 (down-link) and light from the communications source 175 (up-link) are present at essentially the same time and are, in fact, counter-propagating with respect to each other. Note that, in general, the phase encoder and tilt compensator can be in the form of reflective and/or trans-mission elements, as is known in the art.

Turning now to FIG. 2A, a "compensated image" adaptive optical system 200 is shown, typical of the prior art. The goal of this system is to enable precision imaging of an extended object 205 in the presence of dynamic path dis-tortions 220, with the resultant image viewed by camera 290, as viewed through a telescope. The basic adaptive optical aspect of the system functions in a manner similar to that of FIG. 1A. However, in the system depicted in FIG. 2A, there are now two different, distinct input beams incident upon a telescope, comprised of elements 230 and 245. One of the two input beams is designated as a reference beam 210 and provides the same function as that of beam 110 of FIG. 1A. That is, it is in the form of a sub-diffraction-limited optical source (e.g., a glint) that samples the path distortions 220. The other incident light emanating in the region of the reference is an image-bearing beam of an object, 205, whose spatial information is also distorted by the same path distortions 220, and whose high-fidelity compensated image is sought.

The reference and image-bearing beams both traverse the same input optical components and propagation path and co-propagate in the same direction through space. As is known in the art, both beams are assumed to be within the same isoplanatic volume (or, patch), characteristic of the aberration, including the telescope 230, a collimation component, represented by lens 245, tip-tilt compensator 250, spatial light modulator 260, imaging optics 247. The reference beam 210 and the image-bearing beam 205 both impinge upon beam splitter 265.

The beam splitter directs each respective input beam into a different direction. The incident reference beam 210 emerges from one port of the beam splitter as beam 266 and propagates along one direction; and, the incident image-bearing beam 205 emerges from the other port of the beam splitter as beam 267 and propagates along a second direction. The reference beam 266 is directed to the adaptive optical control loop, and the image-bearing beam 267 is directed to a camera/detector module 290. Beam splitter 265 partitions the reference and image beams using a variety of discrimination techniques including polarization, wavelength, spatial frequency, temporal gating, as is known in the art.

In the compensated imaging system 200, the reference beam 266 exiting beam splitter 265 is directed to an adaptive optical processor in a manner analogous to that described with respect to FIG. 1A. However, in the compensated imaging system depicted in FIG. 2A, light from the incident reference beam 210 does not strike the camera 290. The sole purpose of the reference beam in this case is to provide path-distortion information to the wave front error sensor 270 in the servo-loop so that, upon correction of the distortions imposed onto the reference beam, the image-bearing beam can be viewed with little or no distortion.

The feedback loop, operationally, is similar to that of FIG. 1A, namely, the wave front-error sensor (WFS) information output 276 is inputted into processor 275. Processor 277 provides error correcting information to drivers 280 and 285, the outputs of which provide signals to the tip-tilt compensator and the spatial phase modulator, 250 and 260, respectively.

The reference beam 266 emerging from beam splitter 265 passes through an intermediate image plane 255, followed by lens 249, which transforms the beam to a pupil plane. The beam is then scaled by the telescope (lenses 247 and 249) to satisfy the spatial bandwidth constraints of the wave front-error sensor (WFS) 270. In this system, the WFS is a so-called Shack-Hartmann class of configuration. As is known in the art, the Shack-Hartmann WFS consists of a lenslet array 271 and a detector array 273, the latter positioned at the focal plane of the lenslets. This pair of elements provides a spatial mapping of the local tilt phase errors across the overall pupil-plane aperture, that characterize the path-distorted incident reference wave front 210.

As known in the art, the required number of lenslets is a function of the square of the ratio of the input aperture size to that of the coherence (Fried) parameter indicative of the incident wave front distortions. Under these constraints, it is assumed that the incident wave front can be described as a series of plane-wave segments, each with a different tilt, or phase slope, and all concatenated together. Hence, each plane-wave segment is considered as a diffraction-limited beamlet, each with a different tilt angle.

FIGS. 2B (295) and 2C (296), respectively, illustrate the basic prior-art principles of a Shack-Hartmann WFS, as applied to an aberrated wave front 220, and a distortion-free wave front 221 of a plane-wave reference beam. The WFS, identical in both FIGS. 2B and 2C, consists of a lenslet array 271 and a multi-pixel detector array 273, the latter positioned at the focal plane of the lenslets.

FIG. 2B (295) depicts the operation of the WFS assuming an input reference beam whose wave front is aberrated by phase error 220. Each plane-wave segment of the input beam 222 is incident upon a different lenslet in the array 271. Since each input segment is planar, albeit tilted, a diffraction-limited Airy disc pattern will appear at each respective focal plane. However, since each plane-wave segment is comprised of a tilted wave front, the Airy pattern at each respective focal plane at the detector array 273 will be spatially shifted, with the lateral shift increasing with the slope of the local tilt error. A "beam's eye view" at the detector surface 273, in the presence of the aberrated beam, is shown in 274.

Note that the array of focused spots does not precisely overlap the grid-pattern. This is indicative of a typical aberrated beam, whose local tilts are randomly distributed. Therefore, each spot at the plane 274 has a correspondingly different offset in the (x,y) plane relative to the grid pattern. As is known in the art, the camera or ccd array 273 will require a sufficient number and density of resolvable detector pixels to measure the offset in spot position to ascertain the local tilt error with sufficient precision.

FIG. 2C (296) depicts the operation of the WFS assuming an input reference beam whose wave front aberrations have been corrected. In the ideal case, the input beam 221 is a perfect plane wave, with a corresponding equi-phase surface across the entire input aperture to the WFS. As in FIG. 2B, each resolvable plane-wave segment of the input beam 223 is incident upon a different lenslet in the array 271. As before, a set of Airy disc patterns will appear at each respective focal plane along the detector surface 273. However, since each plane-wave segment has the same tilt (ideally, zero degrees with respect to the optical axis), each respective Airy pattern at the focal plane at the detector array 273 will be centered on its respective grid location.

The "beam's eye view" at the detector surface 273, in the presence of the compensated reference beam, is shown in 275. Note that the array of focused spots precisely overlaps the grid-pattern. This is indicative of an ideal plane wave, whose local tilts are identical. Therefore, each spot at the plane 275 has a zero spatial offset in the (x,y) plane relative to the grid pattern. It is the goal of the servo-loop adaptive optical system to drive an aberrated beam (comprised of a finite number of tilted plane-wave segments) to a converged wave front whose differential tilts approach zero, as in 275.

It is important to emphasize that the WFS detects only the reference beam, which, by definition, does not contain image information, other than the spatial information resulting from the intervening propagation-path distortions.

Hence, based on this prior art, in order to realize an image-compensation adaptive optics system, only a reference beam must be present in the WFS closed loop subsystem. Upon convergence, a faithful image of the object beam will be detected by video camera 290.

However, in many applications, a diffraction-limited reference beam will not always be present or practical, even in cooperative scenarios (whereby, knowledge of the existence of a reference beam or of an observer is not a drawback). And, in certain cases, a reference beam optical source may be undesirable for strategic considerations, since detection of a reference optical source by a third party can reveal the presence and/or location of a covert observer. For these and other considerations, it is desirable to realize a compensated imaging system without the need for a cooperative reference beam.

An embodiment in the more recent prior art of a "reference-free compensated imaging system" is shown in FIG. 3A. The goal of system 300 is similar to that of the prior art in FIG. 2A, namely, to enable high-quality imaging of an extended object 305, whose image-bearing beam may have experienced propagation-path distortions along an atmospheric path 320. However, in this embodiment, there is only a single beam that traverses the path distortions and received by the image compensation system 300—the image-bearing beam itself, 306. That is, as opposed to the prior art, there is no independent reference beam (e.g., glint) required to sample the path distortions. In the present case, the image-bearing beam 306 essentially emulates both the image-bearing beam 205 of the prior art, as well as the reference beam 210 of the prior art (both depicted in FIG. 2A).

As depicted in FIG. 3A, the propagation-path distorted, image-bearing beam 306 is incident upon telescope 330, and subsequently, traverses an optical collimator represented by lens 345, a tip-tilt compensator 350, a spatial phase modulator 360, imaging optics 347, followed by beam splitter 365. Beam splitter 365, directs the same image-bearing beam into two different subsystems. One of the image-bearing beams 366 emerging from beam splitter 365 is directed to a spatial filter, followed by a scene-based wave front error sensor (SB-WFS) 370. The other replica of the image-bearing beam 367 emerging from beam splitter 365 is directed to a camera/detector module 390. The spatial filter, which performs low-pass filtering of the pupil plane wave front, is comprised of transform lens 347, a fixed-diameter diaphragm, 356, and transform lens 349. The spatial filter is designed to filter out high spatial frequencies beyond the spatial frequency range of the image-bearing beam to reduce noise in the SB-WFS. The specifications of lens 349 are chosen to provide scaling of the processed pupil-plane image to match the spatial bandwidth of the SB-WFS, as is known in the art.

The number of resolvable elements of the SB-WFS is chosen to be consistent with the number of Fried coherence cells within the area of incident beam to telescope 330/345, which is a function of the atmospheric turbulence conditions along the propagation path, as is known in the art.

In this embodiment, the SB-WFS determines the local tilt error of the beam across each subaperture, but, as opposed to performing the measurement using a reference beam (recall beam 210 in FIG. 2A), the wave front error measurement in the present case is performed using the same image-bearing beam 306 as that of whose compensated image is sought.

In this case, a correlation-based algorithm is used to determine the wave front slope across each subaperture, which is known in the art. This algorithm is necessary, since the wave front across each subaperture of the WFS consists of the atmospheric tilt imposed onto image-bearing information. This is in contrast to the prior art (recall FIGS. 2B and 2C), in which case the reference-beam wave front across each WFS subaperture is essentially in the form of a tilted planar equiphase surface. In the present case, a more robust mathematical operation is necessary to determine the phase slope difference between nearest neighbor atmospheric-turbulent cells, which include image information.

Returning to FIG. 3A, the adaptive optical servo-control loop of system 300 is comprised of the SB-WFS, processor 377, tip-tilt compensator 350 and spatial phase modulator 360, the latter pair of which are controlled via respective drivers 380 and 385, whose respective functions are to minimize residual tip-tilt and spatial wave front errors. This feedback architecture is conceptually similar to that of the prior art (recall FIG. 2A). However, as noted above, the wave front error information is now derived from measurements of the image-bearing beam, as opposed to that of the prior art, in which case, the required wave front error information is derived from measurements of the reference beam.

Without loss of generality, in this embodiment, the SB-WFS 370 is configured as a Shack-Hartmann system, comprised of a lenslet array 371 and a multi-pixel detector 373, the latter of which can be a ccd camera detector (wherein "ccd" stands for charge coupled device.) We note that, immediately upstream of each respective ccd camera detector is an optional image intensifier (not shown in the figure), whose function is to provide high-gain, shot-noise-limited image amplification, as needed. The intensifiers can also be gated and synchronized with the image-sampling rate to enable higher performance compensated imaging, especially, in the case of speckle imaging applications.

As described in FIGS. 3B and 3C below, a corresponding ensemble of identical images will appear at the detector plane. Since each lenslet maps a subaperture limited to a single aberration coherence patch across the pupil plane, each of the respective images will be, in general, slightly displaced, laterally, at the detector plane, indicative of the local tilt across the respective unit coherence cell. In this embodiment, a common spatial filter upstream of the lenslet array will restrict the spectral frequencies of the ensemble of images. The spatial filter cutoff frequency, determined by the diameter of diaphragm 356, is chosen to enable the SB-WFS to optimally determine the wave front slope of each respective subaperture image, a tradeoff being the shot-noise limited performance of the ccd camera detector array on the one hand and the additive noise induced by the high spatial frequency components of the given image on the other hand.

Once the ccd camera detector has acquired the data, it is passed to software, which processes it and estimates the wave-front slopes. The first step in the processing is the correct identification of the locations of the sub-images formed by the SB-WFS on the ccd camera detector. Each of these sub-images has a circular field of view. An inscribed-square sub-image for adequately illuminated subaperture is extracted.

These images are next sent to the slope estimation software. The slopes are estimated in two modes. To estimate the slopes across the aperture at a single instant in time, two references must be known. The first reference is the default offset location of the sub-images when there is no external aberration in the optical system. These reference slopes are determined upon initial calibration of the system. Then a specific sub-image is selected to provide the reference sub-image to which all the other sub-images are compared.

The slopes can also be estimated through time for a single sub-image to enable measurement and characterization of the phase aberration through time. In this case reference slopes for all subapertures are not required, and the reference sub-image is simply the first sub-image in the series.

The algorithm that is used to calculate the sub-image shifts functions by optimally estimating the shift between two images using spatial correlation calculations with sub-pixel interpolation. This algorithm has the advantage that the accuracy and error properties of a scene can be quickly calculated a priori. To be applied to a small telescope using the SB-WFS compensated system, this algorithm has been further enhanced with added functionality. In particular, formulae were derived which enable the estimation of the gain of the scene that is used. This ensures higher-accuracy slope estimates. This gain is calculated by using a larger portion of the sub-image on the ccd camera detector extracted from the circular subfield.

Turing now to FIGS. 3B and 3C, respectively, illustrate the basic principle of the Scene-Based Shack-Hartmann wave front error sensor, SB-WFS. As opposed to prior-art sensors, in the present case, the incident wave front whose local tilts are to be determined is the image-bearing beam itself. The respective figures depict the response of the SB-WFS in the presence of an aberrated image-bearing wave front 320, and a distortion-free image-bearing wave front 321. The SB-WFS, identical in both FIGS. 3B and 3C, consists of a lenslet array 371 and a multi-pixel detector array 373, the latter positioned at the focal plane of the lenslets.

FIG. 3B depicts the operation of the SB-WFS assuming an input image-bearing beam whose wave front is aberrated by 320 and 321, respectively. Each tilted segment of the input beam 322 is incident upon a different lenslet in the array 371. Since each segment is replica of the incident image 305, a diffraction-limited image will appear at each respective focal plane, the diffraction-limit determined by the lenslet subaperture. However, since each respective segment possess an overall tilt, the respective image at the detector array 373 will be spatially shifted, with the shift increasing with the slope of the local tilt. A "beam's eye view" at the detector surface 373, in the presence of the aberrated beam, is shown in 374. Note that the array of image replicas does not precisely overlap the grid-pattern. This is indicative of a typical aberrated beam, whose local tilts are randomly distributed. Therefore, each image at the plane 374 has a correspondingly different offset in the (x,y) plane relative to the grid pattern. The number and density of resolvable pixels of detector array 373 is a function of the required precision of the tilt measurement, as limited by shot-noise considerations and additive noise, consistent with the upstream spatial filter response, as is known in the art.

As noted above, each subaperture is designed to collect and image light from a single spatially coherent Fried cell. Hence, a local wave front tilt error across a given subaperture would result in a slightly displaced lenslet image, 374, in a lateral direction, relative to the other subaperture images.

FIG. 3C depicts the operation of the SB-WFS assuming an input image-bearing beam whose wave front aberration has been corrected. In the ideal case, the input beam 321 is an image-bearing wave, free of differential tilts across the entire input aperture to the SB-WFS. In this case, each Fried cell segment will have zero tilt, as depicted by the segmented set of tilt components, 323. As in FIG. 3B, each resolvable tilt segment of the input beam 323 is incident upon a different lenslet in the array 373. As before, an image will appear at each respective back plane along the detector surface 373. However, since each image-bearing unit cell has the same tilt (ideally, zero degrees with respect to the optical axis), each respective image replica back plane at the detector array 373 will be centered on its respective grid location. The "beam's eye view" at the detector surface 373, in the presence of the compensated image beam, is shown in 375. Note that the array of images precisely overlaps the grid-pattern. This is indicative of an aberration-free image, whose local tilt errors have been corrected. Therefore, each image replica at the plane 375 has a zero spatial offset in the (x,y) plane relative to the grid pattern.

Returning to the system embodiment of FIG. 3A, a typical video output signal of ccd camera detector 373 will appear as an array of nearly identical images (albeit laterally shifted by different amounts). The video output of the SB-WFS 370, given by 376, is inputted into the wave front processor 377, the function of which is to computationally reconstruct the aberrated wave front errors, as induced by the propagation path distortions 320 across the entire input aperture to the telescope 330. The output of processor 377 provides respective tip-tilt error-correction and spatial-wave front error-correction signals to drivers 380 and 385, which, in turn controls the tip-tilt optical and spatial-phase-modulator optical corrector devices, 350 and 360, respectively. Although the optical corrector devices 350 and 360 are represented as a transmission-mode devices in FIG. 3A, it is to be understood that one or both can be configured as reflective devices, as is known in the art.

An optional narrow bandpass filter 379 is also shown in the optical path upstream of the SB-WFS and/or imaging camera 390. The function of filter 379 is to control and, hence, restrict the optical spectrum to be processed and imaged, in the event that out-of-band spectral components may otherwise degrade the signal-to-noise performance of the compensation system.

In addition, a spatial filter, comprised of lenses 347 and 349 and pinhole 356 is shown, whose function is to control the spatial frequency spectrum of the distorted image-bearing beam 366 prior to impinging upon the SB-WFS 370.

The above components constitute the wave front compensation subsystem of the overall system 300. Upon convergence of this subsystem, the image-bearing beam 367 that exits the other port of beam splitter 365 will be viewable by camera 390 with minimal wave front distortions. Note that the resolution of the compensated image at camera 390 can approach the diffraction limit of the input imaging system and telescope 330/345 under ideal conditions.

As is shown below, in the present invention, the SB-WFS performs the function of a subsystem of the overall vibrometer system. In this context, this prior art SB-WFS can be viewed as equivalent to a down-link preprocessor. However, the prior art does not consider an up-link and associated details of its encoding, whose function is to serve as a reference beam. Details of an up-link in this context are not anticipated or obvious to one skilled in the art.

Moreover, the prior art does not consider a vibrometer that employs a reference-free method to compensate for path distortions encountered by the image to be probed, which is not obvious to those skilled in the art for the reasons stated above and in what follows.

The aforementioned state-of-the-art in compensated imaging includes, for example, (i) U.S. Pat. No. 7,617,060, entitled "Extracting higher order information from scene-based Shack-Hartmann wave-front sensing," and (ii) U.S. Pat. No. 8,995,787, entitled "Measurement of wave-front aberration in a small telescope remote imaging system using scene-based wave-front sensing."

Another embodiment of the prior art pertains to the field of laser vibrometry. A laser Doppler vibrometer ("LDV") is basically a laser interferometer designed to remotely sense vibrations of a given object without physical contact of the object, in other words, a non-contact diagnostic.

LDVs can employ either homodyne or heterodyne detection techniques to ascertain the vibrations of the object. In essence, the vibrating object can be viewed as Doppler shifting a probe laser beam and the LDV is an instrument to measure the Doppler spectrum. Vibrometers can be in the form of Michelson, Fabry-Perot, Sagnac, Mach-Zehnder, Fizzeau interferometers, as is known in the art. LDVs can be configured as bulk devices, semiconductor lasers, fiber optic lasers and interferometers. Such devices can be utilized in manufacturing, industrial, medical and defense applications for short or long standoff distance applications.

A common feature of the state-of-the-art in LDVs is that the devices are single-mode, point sources. Hence, the vibrations are detected at a single point along the surface of the object under test. The extension to multiple-point diagnostics typically involves scanning a single LDV across the surface of the object with a single LDV or, utilizing a single line of parallel LDVs in a broom-sweep scan mode.

Another class of multi-point LDV involves surrounding an object with a two-dimensional or three-dimensional array of parallel LDVs that probe the surface simultaneously so that a so-called conformal imaging laser Doppler vibrometer ("CI-LDV") can be realized. This class of system has the benefit of providing whole-body, multiple vibrational-mode characterization of an object under test.

However, each object under test requires a specialty fixture, tailor-made to the object, to mount an array (fiber or free-space) of LDVs that match the shape, configuration, size; and, is therefore limited to a single given object structure under test.

Moreover, the spatial resolution of the vibrational modal analysis in the existing art is limited by the number of elements in the array (e.g., the number of fibers). Depending on the size and shape of the object, the number of sites to be simultaneously examined is limited, due to practical (geometrical) constraints.

Another constraint of the prior art is the standoff distance and line-of-sight between the LDVs and the object, which limits the LDV density and number of LDVs in the system.

Yet another limitation of the prior art is that single and multi-point LDV is limited to distortion-free optical paths between the object and the LDV. Existing adaptive optical techniques would require reference beam information for each LDV in an array. Such requirements become intractable and impractical for high-density, multi-point object characterization. What is needed is a conformal laser Doppler vibrometer capable of sensing vibrations of an object or group of objects (in a constellation) without the need of an ensemble of fixed laser (fiber) arrays and mounts that require precision alignment and specialization to service, in general, objects of different sizes and geometries. Therefore, there is a need to address the foregoing limitations.

Yet another limitation of the prior art is limited to a single-point vibration measurement with a single beam. What is needed is a means by which a single beam can enable the realization of multiple points of vibration measurement along the surface of a work piece, regardless of its shape and standoff distance.

Yet another limitation of the prior art is limited to require a second beam, such as a point source, guide star or glint located on or near an object location, by which to enable a probe beam to adapt to dynamic path distortions. What is needed is a means by which to realize a two-way communications link between an object located as one end of a link and a laser transceiver (vibrometer) located at the other end of the link, without the need for a reference beam.

Yet another limitation of the prior art is limited to require a second beam as a reference beam—such as a beam that illuminates another region of the object (e.g., a plane wave, or via adaptive optics), or a second beam of a different polarization, or a beam of a time delay—relative to the first beam. What is needed is a means by which to realize a two-way communications link between an object located as one end of a link and a laser transceiver (vibrometer) located at the other end of the link, without the need for a second beam as a reference beam.

Moreover, what is needed is a conformal-imaging laser Doppler vibrometer capable of sensing vibrations of an object or group of objects (in a constellation) without the need of an ensemble of fixed and finite laser (fiber) array and mounts that requires precision alignment and specialization to service, in general, objects of different sizes and geometries. In addition, what is needed is a conformal-imaging vibrometer capable of compensating for path distortions.

Yet another limitation of the prior art is that an additional coherent source is required to enable a vibrometer to function in the face of moving objects and path distortions, using adaptive optical techniques. What is needed is a means by which atmospheric distortions can be compensated using only a single vibrometer beam, without the need of a reference laser. Therefore, there is a need to address the foregoing limitations.

The aforementioned state-of-the-art in laser vibrometry includes, for example, (i) U.S. Pat. No. 4,833,314, entitled "Variable phase stop for use in interferometers" (ii) U.S. Pat. No. 8,446,575, entitled "Imaging Doppler velocimeter with downward heterodyning in the optical domain," (iii) U.S. Pat. No. 7,193,720, entitled "Optical vibration imager," (iv) U.S. Pat. No. 7,116,426, entitled "Multi-beam heterodyne laser Doppler vibrometers," (v) U.S. Pat. No. 7,961,362, entitled "Method and apparatus phase correction in a scanned beam imager," and (vi) U.S. Pat. No. 9,829,374, entitled "Method and system for conformal imaging vibrometry," (v) U.S. Pat. No. 10,228,277, entitled "System and method to detect signatures from an underwater object," (vi) U.S. Pat. No. 10,976,239, entitled "Systems and methods for determining polarization properties with high temporal bandwidth," and (vii) U.S. Pat. Application No. 2021/0076944, entitled "System and method for non-contact ultrasound image reconstruction."

SUMMARY OF THE INVENTION

The present invention attempts to address the aforementioned limitations by introducing a conformal imaging vibrometer using reference-free adaptive optics with SB-WFS to enable remote vibrometry of any structural geometry which is not amenable with current state-of-the-art laser vibrometers.

It is an attempt in creating the present invention to provide methods and apparatus of a reference-free, diffraction-limited optical vibrometer between a coherently or incoherently illuminated object, located at the first end of an aberrated path and an optical transceiver, located at the second end of the path, with an intervening path distortion. Initially, the received image of the object at the location of the laser (vibrometer) transceiver, upon propagation over the aberrated path, is comprised of distorted object information due to propagation through the distorting medium, such as atmospheric turbulence, a moving body in a manufacturing application, or a medical environment where a moving (e.g., breathing) patient is being evaluated, etc. This embodiment it is believed enables a compensated, distortion-free image of the object to be realized at the optical communications transceiver.

It is a further attempt in creating the present invention to compensate for the path distortions using only scene-based information, thereby obviating the need for an external, diffraction-limited, coherent reference beam, typical of many adaptive optical systems. In this embodiment, the compensated image-bearing beam at the transceiver forms an effective reference beam with which to generate the wave front correction information, to spatially encode the communications source for reverse propagation to the object. The result of this process it is believed is to realize a distortion-free, diffraction-limited image of the object at the second end of the link using the communications source laser.

A further attempt in creating the present invention is to realize diffraction-limited illumination of the object located at the first end of the link by the vibrometer transceiver, the latter located at the second end of the link, after reverse propagation through the aberration path.

An embodiment of the method utilizes a scene-based wave-front error sensor (e.g., a Shack-Hartmann or a pyramid sensor) to measure the slopes across of the phase fronts of the distorted object beam, as aberrated over an intervening path, e.g., atmospheric distortions. The input to the scene-based wave front error sensor is information from the distorted image of the object and not of a separate, distorted diffraction-limited reference beam, typical of conventional adaptive optical systems. The scene-based wave-front error sensor results in a distortion-free image of the object and, further, provides wave front reconstruction information as input to a computational processor, the output of which is imposed onto spatial light modulators and tip-tilt compensators configured in a conventional closed-loop, servo-controlled architecture, providing the necessary wave-front correction information onto a communication laser source. Hence, the present invention does not require an external reference beam, as required in conventional communication systems. In the embodiments that follow, the laser source is spatially encoded with the spatial-light modulator, enabling a diffraction-limited illumination of the object after reverse propagation over the distorted path. It is an attempt in creating the present invention to realize this vibrometer, using only scene-based information, without the need of an external reference.

This invention is counter-intuitive: In conventional compensated imaging systems, a diffraction-limited reference beam samples the path distortions and provides information to compensate for distortions imposed onto an object beam. In the present invention, the distortions are sampled by the object beam itself, which provides the necessary information to program (or configure) a plane wave communications laser so that a diffraction-limited communication beam arrives back at the location of the object. Hence, the roles of the image-bearing beam and the vibrometer laser are reversed relative to the existing art, since the compensated object beam provides an effective reference to impose onto the plane wave laser communication source.

To the contrary, one skilled in the art would not consider reversing the roles of an image-bearing beam and laser vibrometer source in such a link. That is, in the present case, the object to be probed provides path-distortion information for the correction of a plane-wave laser, and not vice versa.

One can view this system as programming the wave fronts of a laser with information derived from an aberrated object; not the reverse, in which the system effectively programs the wave fronts of a distorted object with information derived from an aberrated reference beam. Moreover, typically, a coherent laser reference beam is utilized in conventional compensated imaging and laser communications systems. In the present case, a coherent or incoherent illuminated object beam can be utilized as a reference to encode the wave fronts of a communications laser.

In another embodiment, the laser source can be modulated with spatial and/or temporal information to be received at the location of the object. Moreover, this laser beam can be amplified to deliver energy onto the object for medical, industrial, directed energy or other purposes. The amplification can be in the form of laser amplifiers, Raman amplifiers or by other means known in the art.

In yet another embodiment, the system can be employed as a whole-body conformal imaging Laser Doppler Vibrometer ("CI-LDV"), using coherent illumination, via the laser source, of an object under test, to generate a reference beam comprised of an image of the object. The output of the system is in the form of an image of the object, with vibration information of the object superimposed in a one-to-one correspondence. The vibration information can be viewed as a spatial phase (Doppler) modulation imposed onto the illuminated image beam at the location of the object, with spatially dependent phase modulation along the surface of the object. That is, each resolvable pixel of the compensated image can, in principle, provide an independent, modulated signal, indicative of the vibration of the object at that pixel location.

Thus, a conformal imaging vibration mapping of the object is realized without the need to direct an array of laser beams, say a fiber array, onto the surface area of the object. The system obviates the need for detailed alignment of each laser vibrometer (as in the prior art), say, in the form of a fiber array, across the surface of the object, but, instead, utilizes the compensated image of the object itself as a reference and makes full use of the resolving power of the imaging system, as opposed to a finite number of laser vibrometers. Hence, a different fixture is not required for a given object's shape or size. Instead, an image of the object provides the necessary information to probe the object.

A coherent heterodyne imaging receiver provides spatial vibrational information of the object on a pixel-by-pixel basis, limited by the resolving power of the optical imaging system (e.g., 1000 to 10,000 pixels in each dimension, for a $f_\#/10$ system across a 10 cm aperture), and, not by the number of independent laser beams or fibers or vibrometers incident upon the object (typically, 10-100 in each dimension), the latter, indicative of the prior art.

Hence, as an example, this invention provides for the evaluation of the vibrational modes of a high-definition MEMS spatial light modulator, in this case, which requires only a single beam to illuminate the SLM at substantially a normal incidence angle and, thus, to evaluate a 1,000×1,000 pixel device.

It is a further attempt in creating the present invention to realize a reference-free conformal imaging Laser Doppler Vibrometer ("LDV") of one or more objects in the field of view of the optical transceiver. The resultant image will possess vibration information superimposed onto the image, independent of the shape of the object or the number of objects in the FOV of the laser transceiver. There is no need to make specialized fixtures or fiber arrangements or robotic manipulation of fiber bundles or free-space multiple beams or beamlets. The present invention adapts to any size and/or shape and/or number of objects, so long as it is resolvable by the imaging system.

It is a yet further attempt in creating the present invention to realize a reference-free, compensated conformal-imaging laser Doppler vibrometer ("CI-LDV") of one or more objects in the field of view of the optical receiver without the need for a coherent beam to illuminate the object. Upon illumination by an incoherent beam, the resultant image will possess vibration information superimposed onto the image, independent of the shape of the object or the number of objects in the FOV of the laser transceiver. There is no need to manufacture specialized fixtures or fiber arrangements or robotic manipulation of a finite number of fiber bundles or free-space multiple beams or beamlets. The present invention adapts to any size and/or shape and/or number of objects, so long as it is resolvable by the imaging system, and the resolution of the vibrometers is now limited by the diffraction limit of the system (which can number 1,000 to 10,000 pixels in each dimension), rather than by the number of finite fibers or laser vibrometers (which typically can number 10 to 100 elements in each dimension).

It is yet a further attempt in creating the present invention to realize vibrometry of a transparent object, at substantially normal incidence, either via reflection or transmission through the sample. Vibrometers typically require a probe beam to be scattered or reflected from an opaque or reflective object. In this invention, a Zernike interferometer is utilized to realize a two-dimensional interferogram, modulated spatially and temporally with vibration information of a whole-body object or a vibrational modes of an extended object or constellation of objects. A multi-channel channelizer can be employed for vibrational analysis and evaluation.

BRIEF DESCRIPTION OF THE DRAWINGS

The accompanying drawings, which are incorporated into and form a part of the disclosure, are only illustrative embodiments of the invention serve to better understand the principles of the invention in conjunction with this description.

FIG. 4 shows a flow chart of exemplary embodiments of the present invention, an embodiment of which employs a Zernike phase contrast interferometer. This flow chart also depicts a closed-loop functionality of the process.

DETAILED DESCRIPTION OF THE INVENTION

Figure 1A:
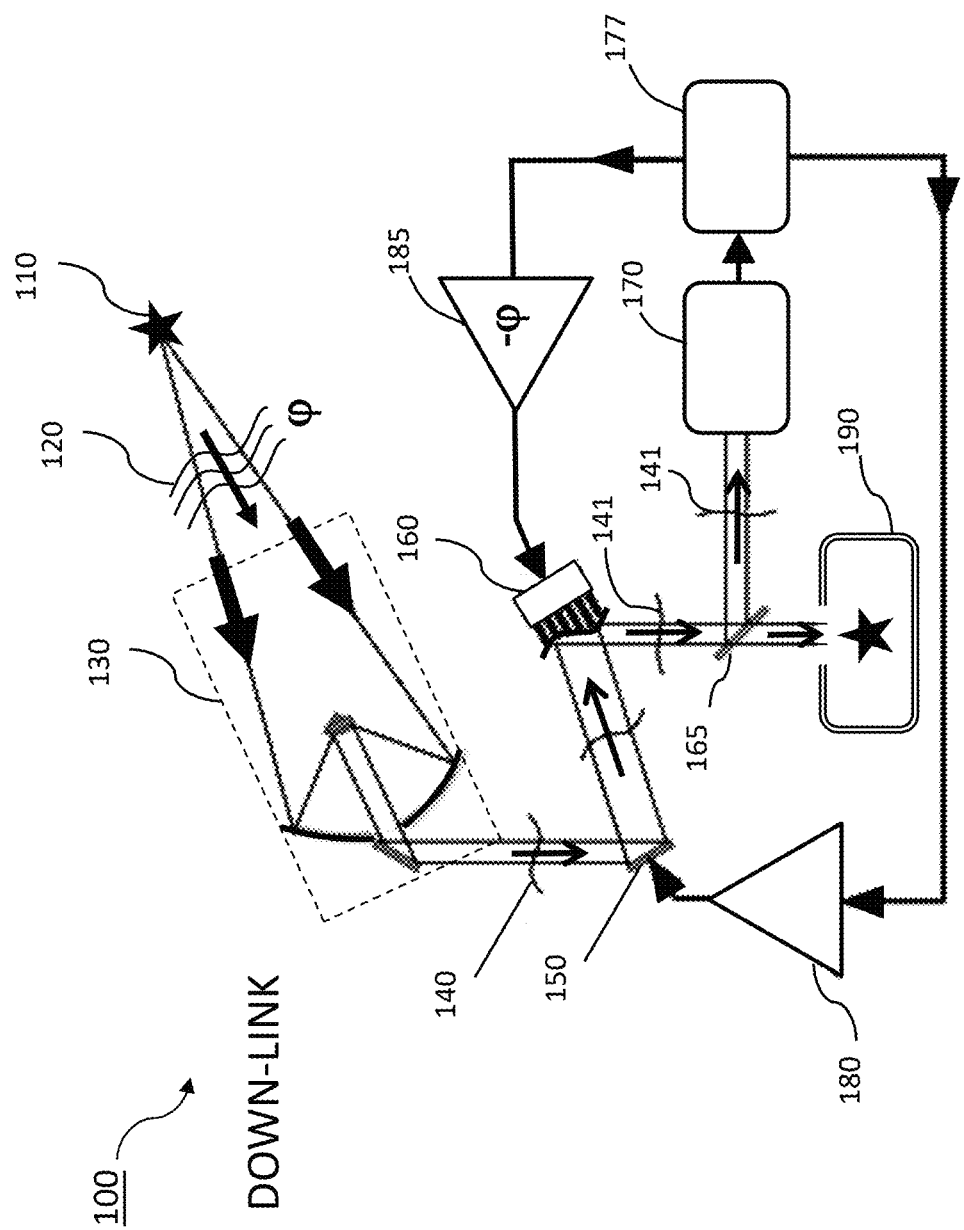
FIG. 1A depicts a prior art typical down-link adaptive optical communications system of the prior art, having the capability of compensating for dynamic wave front distortions encountered by an optical beam upon propagation through an atmospheric path, as viewed through a telescope or microscope.

The goal of the embodiments described herein is eight-fold: (1) Establish an efficient optical vibrometer between an extended object and a vibrometer; (2) Provide a means to correct for intervening path distortions using adaptive optics without the need for a coherent, diffraction-limited single-pixel reference; (3) Provide a means by which the whole-body of an object is efficiently illuminated by the transceiver with only a single beam over the same distorting atmosphere; (4) Provide a means by which a vibrating object can be remotely sensed, and its vibrational modes evaluated, by the system that illuminates the entire object over a distorting path with a single beam; (5) Provide a means by which a transparent vibrating object can be remotely sensed by the system that illuminates the entire object over a distorting path with a single beam; (6) Provide a means to realize a path-compensated, conformal imaging vibrometer so that a mapping of vibrational modes of the an object of arbitrary size and shape can be obtained over an aberrated path (or a moving workpiece or medical patient, etc.) with only a single coherent or incoherent beam, without the need for a free-space or optical fiber array of individual vibrometers and/or specialized fixtures; (7) Provide a means by which the spatial resolution of a vibrometer is limited by the diffraction-limited image of the object and not by a finite number of individual sensing transducers, fibers or laser vibrometers; and, (8) Provide a means by which the process can be repeated (iterated) to realize enhanced signal-to-noise performance.

In the present invention, the compensated laser vibrometer can be viewed as a communications system, across a distorting atmosphere, with a Doppler-modulated source (e.g., a vibrating object) at one end of the link and a laser transceiver at the opposing end of the link, a subsystem of which functions as an adaptive optical, scene-based wave front sensor (SB-WFS) compensated imager.

Turning now to FIG. 4, a flow chart, 400, is shown that depicts the basic operation of the system. The basic system 400 is comprised of a communications link between an object 411 (and 427) and an optical transceiver (414, 415, 416, 422, 424 and 425) between which is an aberrated path (413 and 426). The system is comprised of a down-link propagation path, 410, and an up-link propagation path, 430, which iterates (repeats) via path 428, forming a closed-loop network for enhanced performance.

Note that, in practice, the down-link and the up-link paths precisely overlap and propagate in opposition to each other. Flow chart 400 shows them as counter-propagating and parallel, but spatially separated, the latter for heuristic reasons. It is therefore to be understood that these two paths precisely overlap with each other, and that the down-link and up-link beams (410 and 430) counter-propagate with respect to each other.

Returning to FIG. 4, an illuminated object, 411, is located at the initial end of the down-link path, 410, and, as described herein, is the same object, 427, as at the terminal end of the up-link, 430. The process subsequently repeats via path 428. The object 411 (or 427) can be in the form of a single object or a group of objects. The objects can be opaque, reflective, transparent or translucent.

In one embodiment, an object 411 is illuminated by a source, resulting in a field given by $E(x,t)=Io(x,t)$, where $Io(x,t)$ is the spatially dependent distortion-free illuminated image amplitude. The object 411 can be illuminated by either a coherent source, such as a laser, or by an incoherent source, such as an LED array, sunlight, etc. In the case of an object situated in a long-haul outdoor link, the incoherent illumination can be of the form of sunlight (or a laser). In the case of a short-range link, in a manufacturing or medical application, the illumination source can be in the form of an LED array (or a laser).

In addition, the down-link illuminated object is modulated by 412, yielding the input down-link modulated signal, $M_D(x,t)$. As we discuss below, the modulation can be externally applied by a separate amplitude and/or phase and/or polarization modulator or by the vibrating object itself, the latter of which can be described as a phase modulator, and the latter system, described as an adaptive optical (or compensated) conformal imaging laser Doppler vibrometer (CI-LDV).

The source can be a single beam; as opposed to the prior art, in which the illumination is in the form of a plurality of beamlets, optical fibers or laser vibrometers, arranged by a specialized fixture to service a given object's shape or topology, at a precise standoff distance. In the present invention, a single beam illuminates the extended object, without the need of precision alignment of fixtures or specified standoff distances. Moreover, the source can be incoherent (e.g., sunlight, LED arrays) or coherent (e.g., a laser).

Returning to FIG. 4, light from the illuminated object 411—described by the field $E(x,t)=Io(x,t)$, where $Io(x,t)$ is the spatially and temporally dependent amplitude of the illuminated image surface—propagates through a distorting atmosphere 413. The distortion 413 can be the result of propagation through a turbulent atmosphere, as well as through aberrations due to a manufacturing or medical diagnostic environment or through an optical fiber. By reciprocity, the path distortion is the same for the down-link, 413, as it is for the up-link, 426, but in reverse direction. That is, they each impose the same spatially and temporally dependent, dynamic phase error, PHI, onto the respective propagating field in the form $E(x,t)=Io(x,t)exp(iPHI)$, where PHI is indicative of a turbulent atmosphere. Note that PHI, is, in general, spatially and temporally dependent; that is $PHI=PHI(x,t)$.

In either case, light reflected, scattered or transmitted by the object can be modulated by a modulation signal, $M_D(x,t)$, which can be in the form of an external (amplitude, phase or polarization) modulator, or can be due to the vibrating object itself or a constellation of independent vibrating objects (excited by either a single acoustic mode or a combination of modal excitations).

The distorted down-link beam is subsequently received by an optical vibrometer. The vibrometer is comprised of an optical system, 414, typically a telescope or microscope, which also serves to transmit the up-link beam, 425, the latter in reverse sequence. The elements of 414 (and 425) can be in the form of transmission and/or reflection optics.

The vibrometer is further comprised of a closed-loop adaptive optical system, 415; a means to generate a compensated image 416 of the object 411; a demodulator, that is, a vibrometer (comprised of elements 440, 441, 442, 443 and 444); an up-link optical source (a coherent or incoherent source) 421; a local oscillator 420 for coherent detection; a means by which to spatially encode the up-link source with compensated image information 422; and, a means by which to spatially and temporally encode the up-link source with inverted wave front information 424.

The up-link optical source, 421, typically a laser, is located at the initial point of the up-link path, 430. The up-link optical beam from laser 421 is given by $E(x,t)=1$, and is assumed to be a diffraction-limited, plane wave source, possessing plane wave equi-phase surfaces, with a constant, uniform field amplitude. Hence, the field is represented by unity ("1"). This laser beam forms the source of the up-link path, 430. The up-link source can be an incoherent source, such as a LED array or a coherent source, such as a laser. In the case of coherent detection demodulation, the up-link source 421 is a laser, which forms the carrier frequency for the local oscillator 420.

Figure 3A:
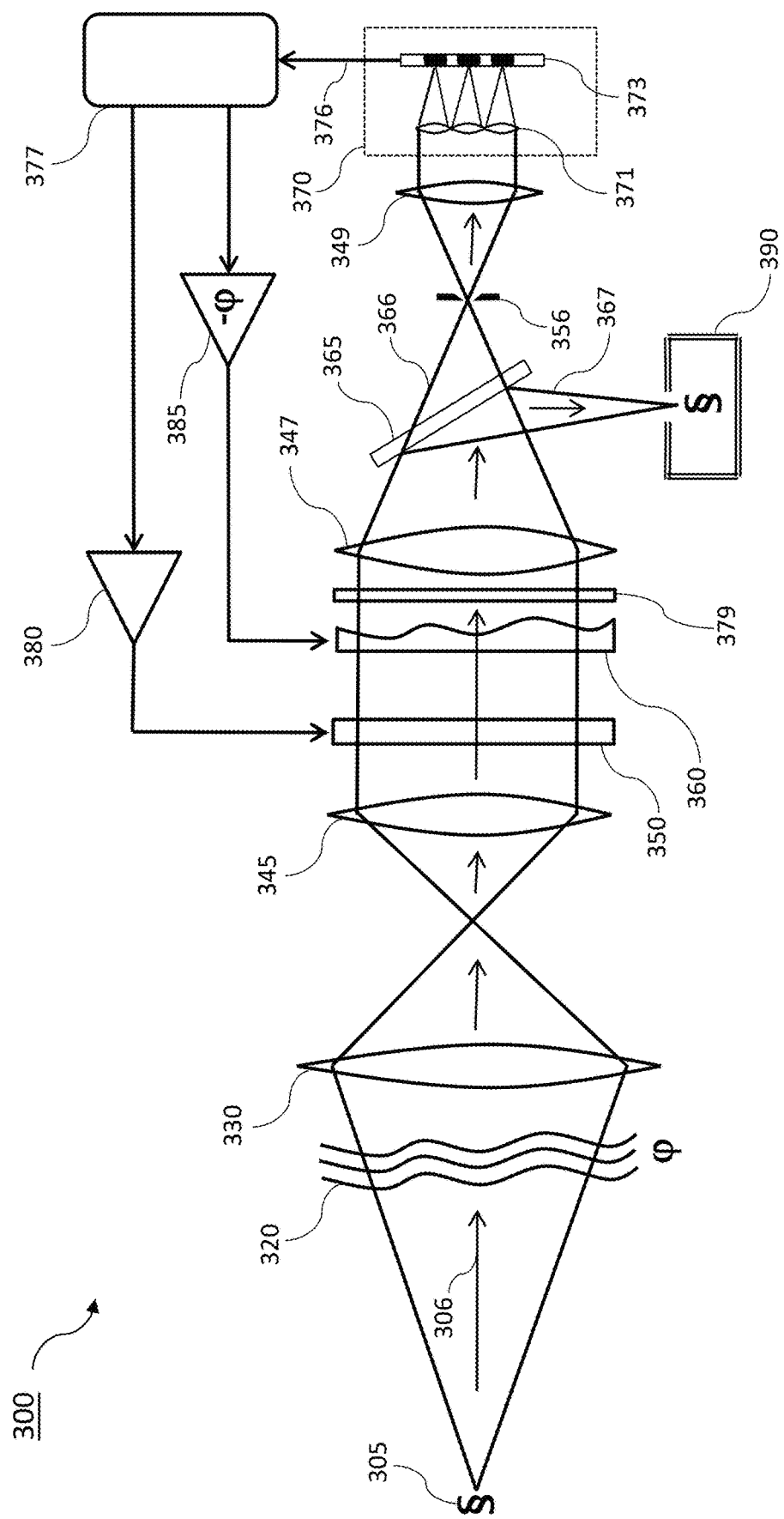
FIG. 3A shows an embodiment of the prior art, depicting a compensated imaging system, as viewed through a telescope or microscope, using a Shack-Hartmann wave front error sensor, having the capability of compensating for propagation distortions imposed onto an image-bearing optical beam, without the need for a point source reference beam.
Figure 3B:
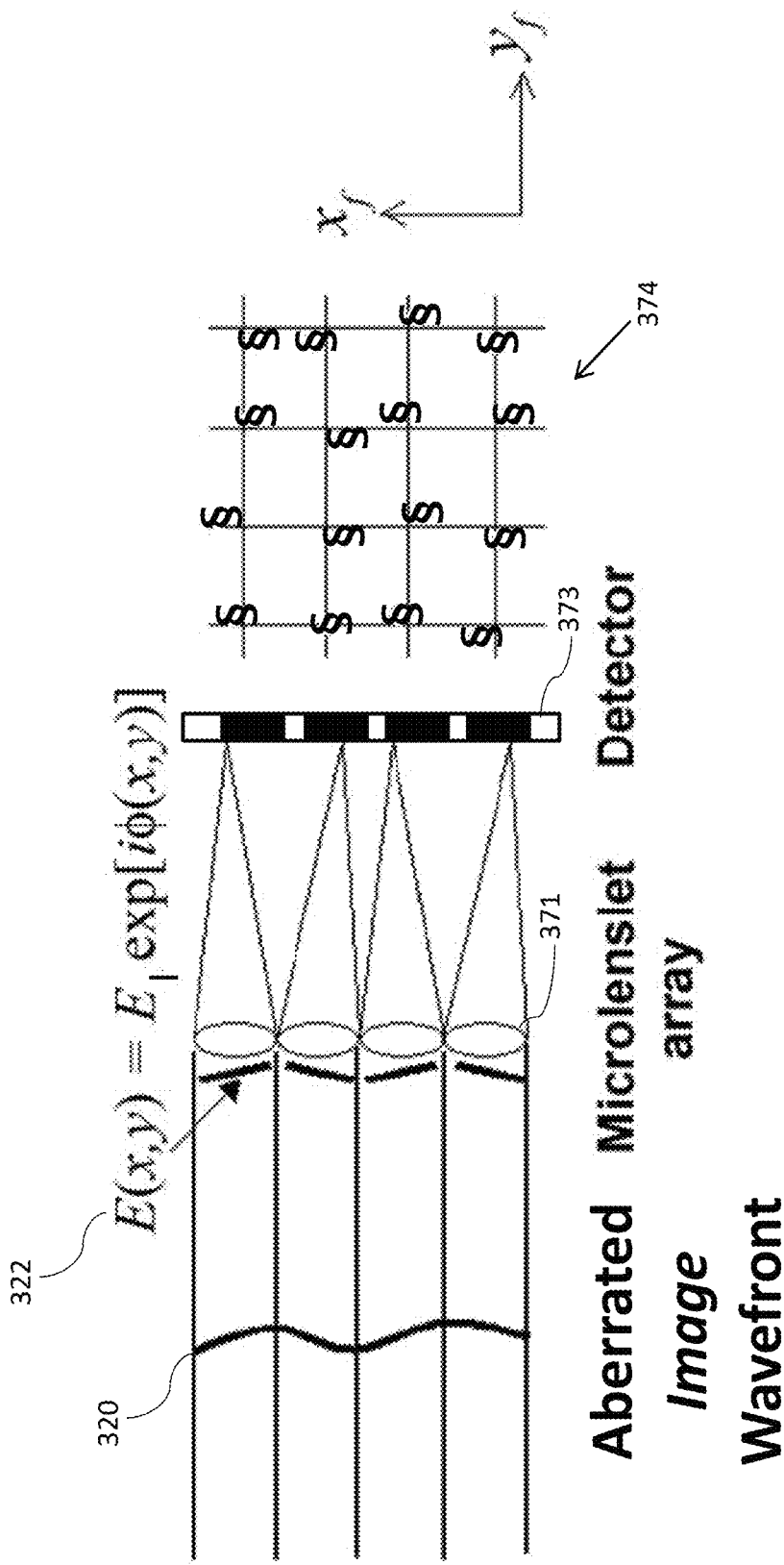
FIG. 3B depicts a Shack-Hartmann wave front-error-sensor system used in the prior art, for the case of an aberrated image-bearing beam, showing an array of microlenses, or lenslets, that focuses the image-bearing beamlets onto a detector array.
Figure 3C:
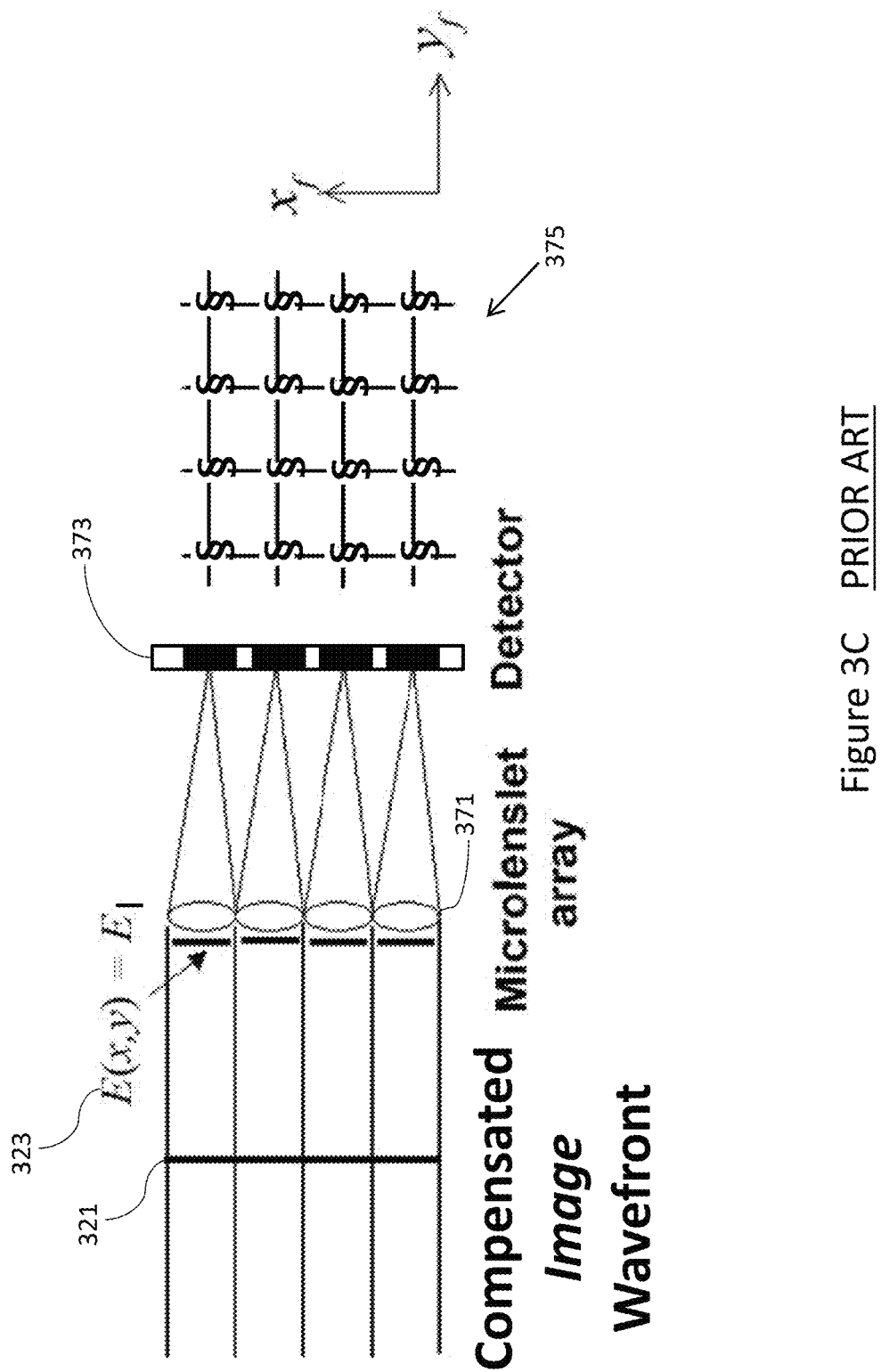
FIG. 3C depicts a Shack-Hartmann wave front-error-sensor system used in the prior art, for the case of a compensated (unaberrated) image-bearing beam, showing an array of microlenses that focuses the image-bearing beamlets onto a detector array.

The closed-loop adaptive optical system, 415, is comprised of a scene-based wave front error sensor (SB-WFS), and a wave front reconstruction processor that imposes wave front correction information onto the beam via a deformable mirror or other class of spatial phase modulator, arranged in a servo-controlled, closed-loop architecture, as is known in the art (recall FIG. 3A) This operation results in a beam 416, $E(x,t)=Io(x,t)exp(-iPHI+iPHI)=Io(x,t)$, which is that of the compensated distortion-free, image-bearing beam.

The reconstruction processor 415 utilizes the distorted image of the object itself as a reference wave front. This is opposed to the prior art, which requires an external, coherent, sub-diffraction-limited optical beam such as a laser, glint, guide star, etc. (recall FIGS. 1A and 1B). As is described in the more recent prior art (recall, FIG. 3A), the wave front processor includes a scene-based wave front sensor (SB-WFS), a computer-based wave front reconstruction subsystem, a tip-tilt compensator, a spatial light modulator, and respective drivers.

As a result of the reconstruction wave front processor, 415, an inverted phase, $-PHI$, is imposed onto the image-bearing down-link 410 received beam 414. The resultant field is given as $E(x,t)=Io(x,t)\exp(-iPHI+iPHI)$, thereby resulting in a compensated image of the object 416, given by $E(x,t)=Io(x,t)$. Hence, a distortion-free image of the object is obtained via 416—or, via 440, the latter, employing Zernike interferometry in the case of a transparent or translucent object—thereby completing the down-link.

In addition, as a result of the reconstruction wave front processor, 415, an inverted phase, $-PHI$, is imposed onto the up-link beam source 421 via the spatial phase modulator 424 via 415. This results in an up-link beam given by $E(x,t)=Io(x,t)\exp(-iPHI)$.

This beam then exits the vibrometer through telescope 425, as up-link beam 430. Upon reverse propagation back through the atmospheric distortion 426, the resultant field is given by $E(x,t)=Io(x,t)\exp(-iPHI+iPHI)=Io(x,t)$ at the terminus of the up-link path 430, illuminating the location of the object 427 as a distortion-free image. Thus, this beam illuminates the object with the same illumination pattern as the initially illuminated object 411, subject to the diffraction limit and field-of-view (FOV) of the system. At this point, the sequence repeats, via path 428, and the next iteration proceeds, thereby forming a closed-loop, optical communications network between object 411 and the vibrometer.

Returning to FIG. 4, the down-link communicated signal 412 (i.e., the vibrations of the object) is demodulated by 442 via coherent (heterodyne) detection in the form of a 2-d modulated interferogram, which represents the signal spatially 443, yielding a pixelated mapping of the vibration signal, $M_D(x,t)$, 444. In the case of coherent heterodyne or homodyne detection, a local oscillator 420 is present, using the up-link laser 421 as a carrier source. Demodulator 442 is comprised of a multi-channel heterodyne interferometer, which is detected by a multi-channel receiver, typically, a high-speed, two-dimensional multi-pixel ccd detector.

For most applications, the measured vibrations are normal to the surface. In some specific instances, the collected light may not be received entirely from the surface normal. In the latter case, the surface displacement of the vibrating object 411 in the direction normal to the surface can thus be ascertained given the a priori surface topology of the object, on a pixel-by-pixel basis, and the resultant output of the multi-channel ccd detector, also on a pixel-by-pixel basis. Using geometrical analysis, the desired normal temporal vibration amplitude, $V_N$, is given by $V_N(x,t)=M_D(x,t)/\cos(theta)$, where $M_D(x,t)$ is the measured spatio-temporal displacement—i.e., the output of the demodulated signal 444 at each resolvable pixel across the surface of the object—and theta is the angle between the normal to the surface and the angle of the measurement displacement (typically, where $\ll 1$, so, $\cos(theta) \sim 1 - ^2$), which is known by a look-up table, given the shape and topology of the object at each pixel location. In this case, the demodulated signal 444 can be viewed as an output from a conformal imaging laser Doppler vibrometers (CI-LDV).

Note, in the present invention, that the number of resolvable vibration pixels is indicative of the spatial resolution of the object (using a single-beam vibrometer) and not by the number of fibers or laser vibrometers, the latter of which is typical of the prior art in CI-LDVs. Hence, the spatial resolution of the present invention can be in the range of 100 to 1,000 pixels in each dimension, as opposed to the prior art, where the spatial resolution is limited to the number of independent vibrometers, fibers, etc. ($\sim 1$ to 100 pixels in each direction).

The system employs two different spatial light modulators 422 ($SLM_1$) and 424 ($SLM_2$). In the case of $SLM_2$, inverted wave front information, $-PHI$, indicative of the path distortion 413, is imposed onto the up-link beam 430 by spatial light modulator 424 ($SLM_2$), via 415. This operation results in the compensation of atmospheric distortions at the location of the object 427 at the terminus of the up-link 430.

On the other hand, spatial and temporal amplitude information, indicative of the image-bearing compensated image, $Io(x,t)$, 416 are imposed onto the up-link beam by spatial light modulator 422 ($SLM_1$). This results in an illumination beam pattern that precisely illuminates the object 427 at the terminus of the up-link 430.

It is to be appreciated that there is a fundamental difference in the functions of the operations, and, hence, design requirements, of 422 ($SLM_1$) and 424 ($SLM_2$), vis-à-vis spatial and temporal encoding information and image resolution. The function of 422 ($SLM_1$) is to encode spatial information of the compensated image ($Io(x,t)$) onto the up-link beam, 421, as derived from 416. Hence, the spatial resolution of operation 422 ($SLM_1$) is that of the extended object, subject to the diffraction limit and the FOV of the system, to resolving the object, 416 (and, not the path distortions, 413).

On the other hand, the function of 424 ($SLM_2$) is to encode wave front correction information (the inverted wave front phase, $-PHI$) onto the up-link beam to correction for path distortions (due to 413), as derived from 415. Hence, the resolution of operation 424 ($SLM_2$) is that of the path distortions (413): the Fried cells, subject to the Nyquist conditions, and not the object information.

Therefore, the functions of these spatial light modulators, and, hence, 422 and 424, differ fundamentally (spatially and temporally), which is not anticipated in the prior art.

As an example, the spatial resolution of a typical atmospheric path distortion, and for a typical telescope aperture, is on the order 10 to 100 resolution elements in each dimension; whereas the spatial resolution of an object in a typical telescope is on the order of 1,000 to 10,000 elements in each dimension, as determined by the diffraction-limited resolution of the telescope and imaging system.

Returning to FIG. 4, we note that, by reciprocity, elements 415 and 424 are one in the same (but in reverse sequence) and are partitioned for ease of understanding the function of the overall system. Operation 415 receives the down-link, distorted beam, $E(x,t)=Io(x,t)\exp(+iPHI)$, whereas operation 424 addresses the up-link light beam, $E(x,t)=Io(x,t)$. The wave front reversed laser up-link beam, $E(x,t)=Io(x,t)\exp(-iPHI)$, then passes through the same telescope (or microscope) transmitter, 425, as did the down-link beam 413, the latter for reverse transit through the atmosphere, 426, whose distortion is assumed unchanged during the propagation relative to its initial aberration, 413, as the down-link beam encountered. (This assumption is based on the round-trip photon transit time from the aberration to the transceiver and back, being less than the time constant of the aberration, the details of which are well-known in the art.)

After reverse transit through 426, the up-link beam illuminates the object, 427, with a field given by $E(x,t)=Io(x,t)\exp(-iPHI+iPHI)=Io(x,t)$, subject to the overall system diffraction limit. The light-illuminated object can then become the second iteration of the initial illuminated object via path 428, and the process repeats as necessary. Therefore, the illuminated object 427 by the up-link laser 421 effectively becomes the down-link illuminated object 411 for subsequent iterations, thereby increasing the signal-to-noise of the vibrometer.

Figure 5:
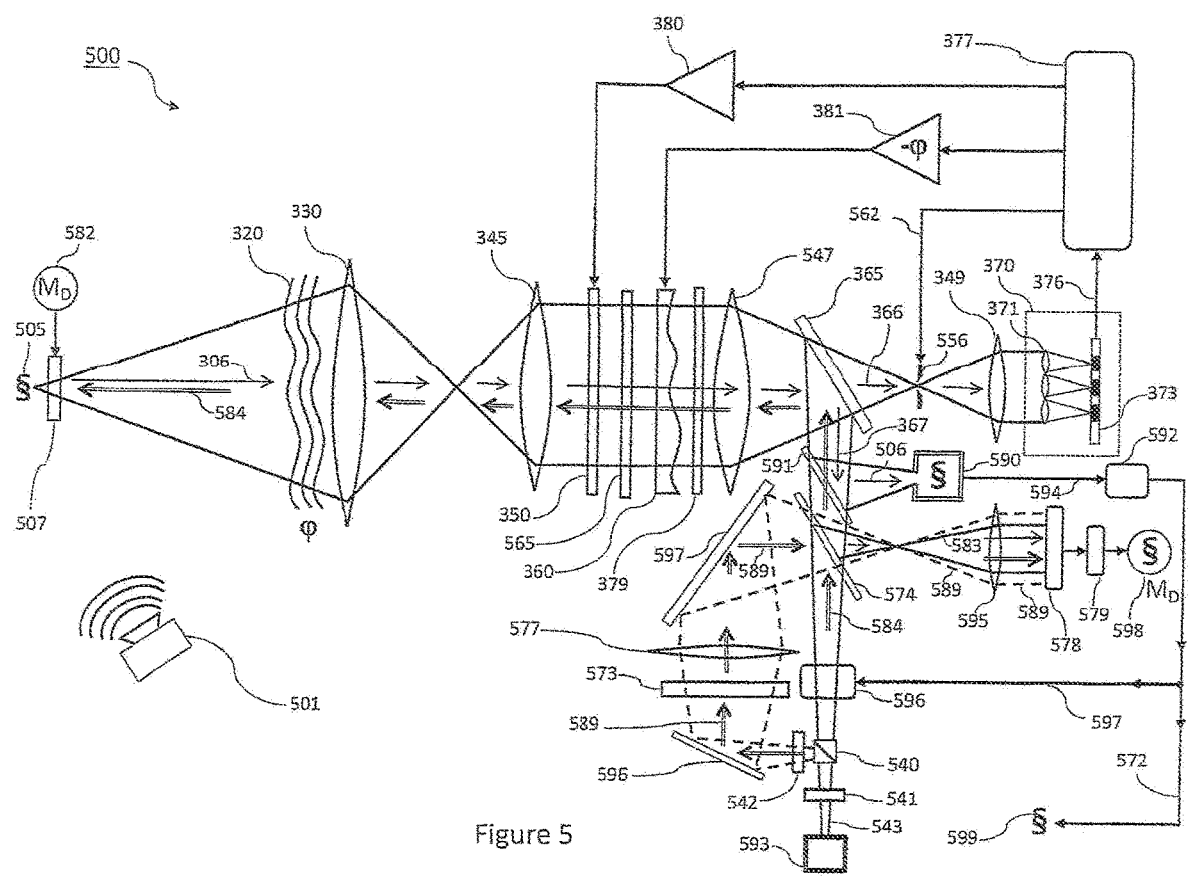
FIG. 5 shows an exemplary detailed embodiment of the present invention depicting a reference-free, whole-body, scene-based adaptive optical conformal imaging vibrometer over an aberrated path (e.g., a turbulent atmospheric path). The vibrometer employs a spatial-dependent coherent heterodyne multi-pixel detector to ascertain a map of vibrational modes of an object or constellation of objects and its evaluation.
Figure 6:
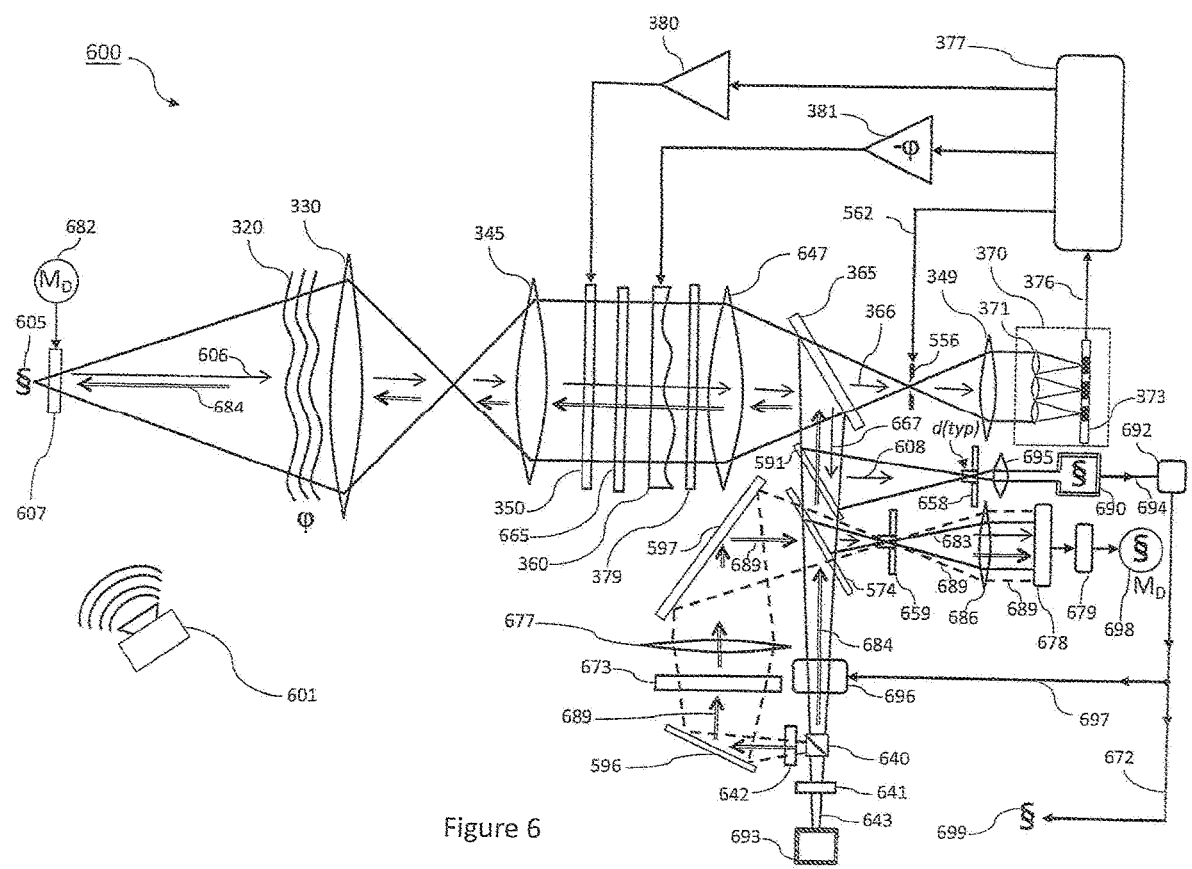
FIG. 6 shows an exemplary detailed embodiment of the present invention depicting a reference-free, whole-body, scene-based adaptive optical conformal imaging vibrometer over an aberrated path (e.g., a turbulent atmospheric path) and employing Zernike interferometry, in the case of transparent, translucent or reflective objects. The vibrometer employs a spatial-dependent coherent heterodyne multi-pixel detector and channelizer to ascertain a map of vibrational modes of an object or constellation of objects.

The following figures describe exemplary embodiments of the system 400, for the case of coherent detection of vibrating opaque objects (FIG. 5), and for the Zernike coherent detection for the case of a vibrating transparent, translucent or opaque objects (FIG. 6).

Turning now to FIG. 5, details of an exemplary embodiment 500 are shown that enables a SB-WFS system to realize the following nine functions: (1) illuminate an object 505 with a source 501 or 593; (2) receive an imaging-bearing beam 306 from the illuminated object 505, with a down-link modulation signal, 582, $M_D(x,t)$ imposed onto the beam by a vibrating object; (3) compensate for path distortions between the object and the vibrometer; (4) generate a compensated image of the object; (5) demodulate the signal via a 2-d heterodyne detector; (6) generate a 2-d pixelated mapping of the vibrations; (7) analyze the vibrational mode(s) of the vibrating object(s); (8) subsequently direct (i.e., transmit) a laser 593 optical beam 584 back to the location of the given object, 505, with whole-body illumination capability (limited by the system FOV), through a turbulent atmosphere 320, with diffraction-limited performance; and, (9) subsequently, repeat or iterate the process whereby the illuminated object forms a closed-loop communications network between the object and the vibrometer.

The present invention can therefore be viewed as a path-compensated, reference-free, single-beam conformal-imaging laser Doppler vibrometer (CI-LDV), using scene-based adaptive optics.

In the embodiment shown in FIG. 5, there is no required reference laser, guide star, glint or other diffraction-limited reference beam necessary to sample the path distortions. Instead, an incoherently or coherently illuminated (501 or 593) image-bearing beam from the object itself 505 forms an equivalent reference beam 306 that samples the intervening atmosphere, 320.

Note also, as opposed to the prior art (wherein a plurality of illuminated beams is required of whole-body vibrometry), in the present invention, only a single illumination beam is necessary to illuminate an extended object, within the field-of-view (FOV) of the system.

Moreover, as opposed to the single-pixel reference beam of the prior art (recall FIG. 1A), the light emerging from an extended object (i.e., the reference beam) can be comprised of multiple pixels that correspond to the object itself.

As we discuss below there are two different spatial light modulators, SLMs (360, $SLM_2$; and 596, $SLM_1$), that accomplish the respective tasks of wave front correction (inverted phase=−PHI) and, also, image-bearing readout [$E(x,t)=Io(x,t)$].

A scene-based wave front sensor (SB-WFS) system uses this image-bearing (306) inverted wave front wave front information (−PHI) to "pre-distort" and spatially encode the laser beam 584 via $SLM_2$ 360 and tip-tilt compensator 350. Specifically, the wave front error sensing (370) and compensated imaging adaptive optical wave front inversion subsystem (377) are utilized to this end.

Note that the light-based source, can be a coherent source, such as a laser, or an incoherent source, such as an LED array. This embodiment enables one to achieve diffraction-limited communication (vibrometry) with an object without the need of an external point-source reference beam.

In addition, the compensated image-bearing beam 506 forms the equivalent reference by which to encode an up-link laser 593 via spatial light modulator, $SLM_1$, 596 with compensated image information [$E(x,t)=Io(x,t)$].

Light (501 or 593) from an incoherently or coherently illuminated object 505 propagates as beam 306 through an intervening atmospheric distortion 320 and is received by the compensated imaging system, which is comprised of a telescope formed by optical elements 330, 345 and 547. The telescope elements can be in the form of lenses, mirrors or a combination thereof. Note that the object illumination beam can be externally illuminated by 501 or can be illuminated by the up-link laser 593.

An optional spectral filter 379 is used to remove undesirable spectral bands from adding noise to the system. A polarizer 565 assures that the incident beam 306 and the laser 593 beam 543 are co-polarized for efficient heterodyne detection.

A fraction of the incident beam 306 propagates as 366 through beam splitter 365, then through a spatial filter, represented by pinhole 556 and lenses 547 and 349. The function of this spatial filter is to optimize the spatial frequency spectrum of the distorted image-bearing beam 366 prior to impinging upon the SB-WFS 370.

In this embodiment, spatial filter bandpass iris (pinhole) 556 is variable in diameter, as servo-controlled by 562 via processor 377 to optimally set the spatial filter bandpass in real-time. Specifically, spatial filter iris 556, is controlled to limit high-spatial-frequency image content from "spilling over" into adjacent Shack-Hartmann ccd elements 373, which would otherwise result in a source of noise in the ccd array. Using this servo-controller, the fidelity of the reconstructed wave front, as determined by the SB-WFS, will become a more faithful wave-front-reversed representation of the path distortions, via this bootstrap modality.

The beam 366 is then incident upon a scene-based wave front sensor (SB-WFS) 370, which, in this case is of the Shack-Hartmann variety (a pyramid SB-WFS can also be used), represented by lenslet array 371 and detector array 373, such as a ccd array. Immediately upstream of the ccd detector is an optional image intensifier (not shown in the figure), whose function is to provide high-gain, shot-noise-limited image amplification, as needed. The intensifier can also be gated and synchronized with the image-sampling rate to enable higher performance compensated imaging, especially, in the case of speckle imaging applications.

The output 376 of the SB-WFS 370 is processed by 377, which includes a wave front reconstruction processor and associated algorithms, as is known in the art. The output of the processor is directed to a tip-tilt driver 380 and wave front inversion (phase equal to −PHI) driver 381, which imposes this information onto wave front 306, respectively, comprised of a tip-tilt compensator (otherwise known as a fast steering mirror) 350 and a wave front spatial phase modulator $SLM_2$ 360 (typically a deformable mirror, a MEMS device, a metasurface device, a liquid crystal spatial phase modulator or equivalent).

The system functions as a servo-controlled adaptive optical processor, which, upon convergence, compensates for wave front distortions 320 and tip-tilt errors, subject to the servo-loop gain, as is known in the art.

Upon closed-loop convergence, the resultant field, $E(x,t)=Io(x,t)$, corresponds to the compensated image-bearing beam 306 from the object 505 (subject to the servo-controlled gain, as is known in the art).

Returning to FIG. 5, a portion of the light 306 is reflected from beam splitter 365, as beam 367, and is reflected by a second beam splitter 591 as beam 506. This distortion-free, image-bearing beam, $E(x,t)=Io(x,t)$, is detected by 590, which is comprised of a video camera (e.g., a ccd).

The video output 594 from the camera 590 is processed by 592 (e.g., contrast enhancement, edge detection, etc.). One fraction of the video signal from 592-572—is directed to the video output 599 for viewing, which is a distortion-free image of the illuminated object 505. This image will be compared against the 2-d heterodyne vibration mapped image 598, as described below.

The other fraction of the video signal, 597, is directed to an amplitude 2-d spatial light modulator $SLM_1$ 596, which encodes the spatial information 597 of the compensated image, $E(x,t)=Io(x,t)$, onto laser vibrometer source 593 beam 543.

Note that the laser 593 provides a diffraction-limited beam 543 [$E(x,t)=1$], which passes through a Faraday isolator 541 to prevent reflected light from destabilizing the output of the laser 593. A portion of beam 543 passes through beam splitter 540 to the $SLM_1$ 596.

The spatially modulated light beam 584 propagates through beam splitters 574 and 591 and is reflected by beam splitter 365 in a direction counter to the incident image-bearing beam 306.

As described above, beam 584 is subsequently encoded with inverted wave front correction information (–PHI) by spatial phase modulator, $SLM_2$, 360 and tip-tilt compensation device 350.

Return beam 584—now encoded with spatial amplitude information [$E(x,t)=Io(x,t)$] by $SLM_1$ 596, and with (inverted wave front) spatial phase information [$\exp(-iPHI)$] by $SLM_2$ 360 and 350—exits the transceiver through telescope lenses 547, 345 and 330. This reverse-propagating beam at the exit of the telescope is given by $E(x,t)=Io(x,t)\exp(-iPHI)$.

Returning to FIG. 5, upon propagation of beam 584 back through the atmospheric distortion 320 (PHI), the resultant beam is given as $E(x,t)=Io(x,t)\exp(-iPHI+iPHI)=Io(x,t)$. Hence, the object is illuminated by a diffraction-limited, distortion-free image bearing beam 584 substantially similar to the initial illuminated object, $Io(x,t)$. The fractional (i.e., spatial) illumination across the whole body 505, and the spatial resolution of the system can be controlled by varying the field-of-view (FOV) of the of the vibrometer telescope.

The illuminated object 505 by beam 584 forms a subsequent iteration and the process repeats as beam 306 (via path 428 of FIG. 4) for the next iteration pass of the system, thereby completing a closed-loop network between the object 505 and the vibrometer.

By reciprocity, this counter-propagating laser beam 584 will—upon reverse propagation through the wave front $SLM_2$ 360 and the tip-tilt compensator 350—emerge from the system as a wave front-reversed replica of the incident aberrated beam 306, with image-bearing image information, $E(x,t)=Io(x,t)\exp(-iPHI)$. That is, the reverse-propagating light beam will be spatially encoded and emerge in a direction back to the object as wave front-reversed replica of the atmospheric distortions. As the laser beam 584 propagates back through the distorting medium (e.g., a turbulent atmosphere), it will "undo" the phase aberrations that were experienced by the initial image-bearing beam, ultimately, illuminating the original object as a diffraction-limited coherent beam, $E(x,t)=Io(x,t)$.

This reverse-propagating beam will propagate over the same path back to the initial location of the object 505. Ideally, the return beam will form at the object location as a diffraction-limited beam. This information will then be directed back to the object, that is, the up-link, as a diffraction-limited beam, minimizing the bit error rate of the link.

The process then repeats, with the light-beam illuminated object forming the required object 505 for a subsequent iteration (recall FIG. 4; 428), modulation, etc., thereby forming a closed-loop communications system between the object and the vibrometer.

At least two different conditions must be satisfied to assure that the phase-conjugate wave illuminates the object as a diffraction-limit beam. First, it is assumed that the atmospheric path distortion and the position of the object do not change appreciably during the round-trip transit time of the phase-conjugate beam over the initial path, as is known in the art. Second, it is assumed that the incident object (down-link) beam 306 and the laser (up-link) beam 584 both fall within the isoplanatic volume. The second condition is always satisfied, since the incident beam is spatially encoded as an extended object, while the return laser beam, in this case, is equivalent to the image of the extended object. Hence, by definition, the return beam will lie within the isoplanatic patch, indicative of the atmosphere distortions.

Returning to FIG. 5, another portion of beam 367 propagates through beam splitter 591 and is reflected by beam splitter 574, emerging as beam 583. This beam is collimated by lens 595 onto detector 578 and forms the terminal end of the down-link (compensated) portion of the system. This signal combines with the local oscillator beam 589 to realize pixelated 2-d coherent detection mapping representation of the signal $M_D(x,t)$, as described below.

Returning to FIG. 5, one fraction of the signal from 592-572—is directed to the video output 599 for viewing. The other fraction, 597, is directed to an amplitude spatial light modulator 596, which encodes the spatial information 597 of the compensated image onto laser communication source 593. The laser 593 provides a diffraction-limited beam, $E(x,t)=1$, 543, which passes through a Faraday isolator 541 to prevent reflected light from destabilizing the output of the laser 593.

Returning to FIG. 5, one portion of the laser beam 543 is beam split by splitter 540 to form the local oscillator beam 589 for heterodyne detection of the down-link modulated signal beam 582, $M_D(x,t)$.

The local oscillator beam 589 passes through Faraday isolator 542 to prevent spurious reflections from destabilizing the laser 593. This beam is reflected by mirror 596 and is modulated by modulator 573 (typically, frequency shifted by a Bragg cell, acousto-optic modulator or equivalent, as is known in the art), thereby forming the local oscillator for coherent detection of the beam received from the illuminated object, 583 (the local oscillator beam 589 path is designated by the dashed lines).

The frequency-offset local oscillator beam 589 is reflected by mirror 597, passes through beam splitter 574 and is collimated by lenses 577 and 595, with its output incident upon coherent detector 578.

The signal (due to the vibrating object and/or the down-link signal) is heterodyne detected by the coherent combination of the signal beam 583 and the local oscillator beam 589 at detector 578.

Local oscillator beam 589 is designed to have a greater beam diameter than (image-bearing) signal beam 583 to assure overlap of the local oscillator beam with the signal beam.

The output of detector 578 thereby reveals the coherent detected, 2-d heterodyne demodulated down-link signal 598, $M_D(x,t)$ that was initially modulated by the vibrating (and/or wobbling) object, represented by modulation signal 582—either whole body vibrations or a multitude of vibrational modes of the body or constellation of objects.

A multi-channel channelizer 579 processes the 2-d heterodyne video signal for analysis, thereby revealing a pixelated mapping of the vibrational modes of the object(s), represented by 598. This mapping can be compared against the compensated image video signal 599 for further analysis and characterization, the comparison of which can be ascertained using image processing algorithms, as is known in the art.

The compensated image of the vibrating object can be viewed spatially via 599, whereas its spatially dependent vibrational spectrum can be revealed by $M_D(x,t)$, 589. Note that the system is capable of providing spatial information as to the global and/or local vibration modes of an extended object (an airplane wing or automotive work piece) or a collection of independent objects (e.g., multi-pixel MEMS devices for evaluation). This class of vibrometer illuminates the entire object with a single beam (via a telescope or microscope), limited by the diffraction limit of the system and it's FOV—which can be on the order of 1,000 to 10,000 effective pixel locations on the object—as opposed to the prior art, which requires multiple beams as point sources to illuminate multiple points along the surface of an object, limited by geometrical and structural factors (which is on the order of only 10 to 100 interrogation locations on the object) which is much less than that of the diffraction limit. The entire object is illuminated, which can be controlled by varying the FOV of the telescope (or microscope).

Note also, that this vibrational information is realized by illuminating the entire object within to FOV with a single laser beam, as opposed to the prior art, which requires multiple, independent beams. Moreover, as opposed to the prior art, the present invention does not require any physical fixture attached to the object. Furthermore, the resolution is diffraction limited; that is, the effective number of interrogated pixels is limited by diffraction and is not limited by a finite number of laser vibrometers, as is the case with the prior art. Furthermore, the present invention compensates for path distortions. This is opposed to the prior art, which required a finite ensemble of independent laser vibrometers, attached to a fixture at a fixed standoff distance from the object and, moreover, the prior art system does not compensate for path distortions.

Figure 2A:
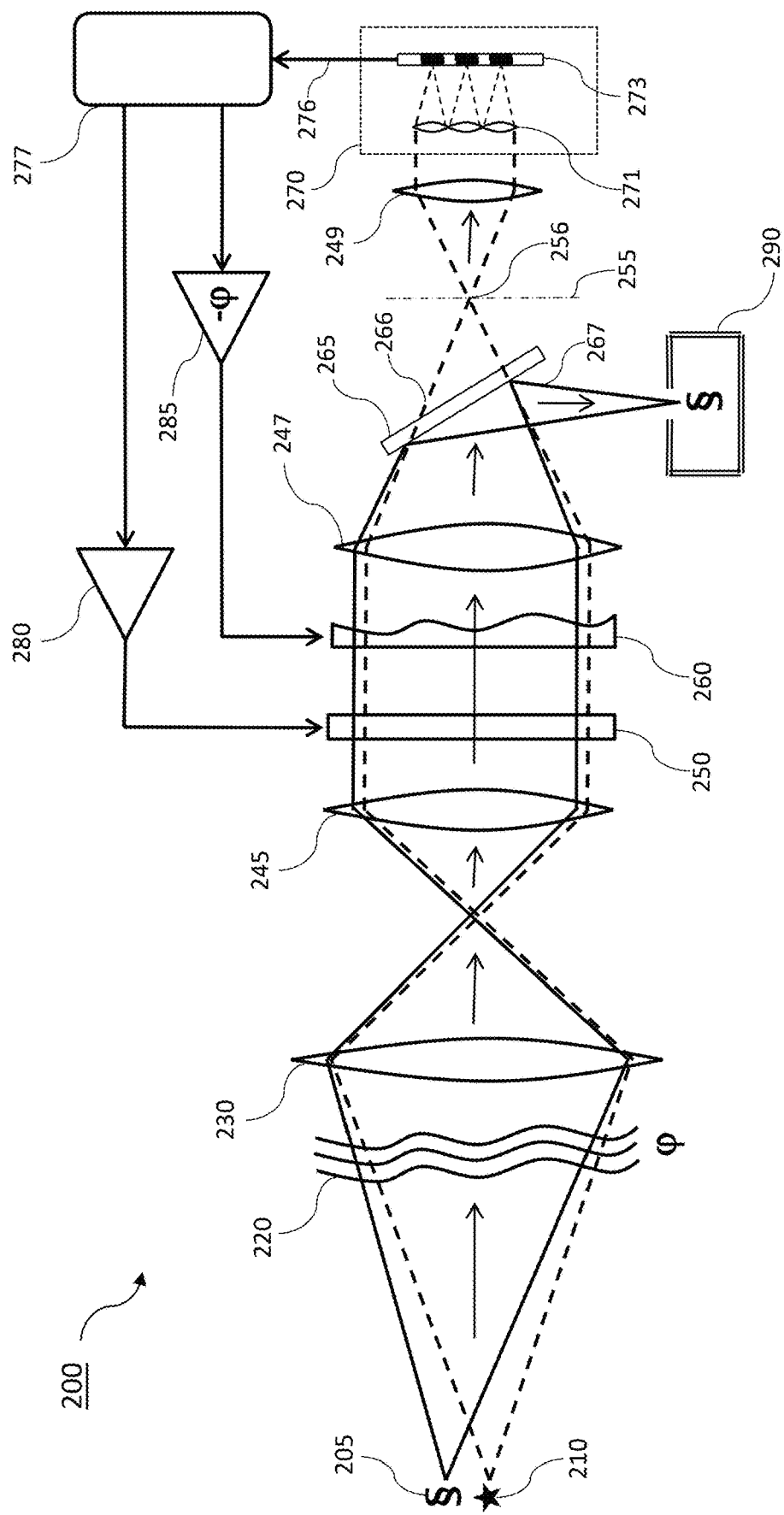
FIG. 2A depicts a prior art typical compensated imaging system of the prior art, having the capability of compensating for propagation distortions imposed onto an image-bearing optical beam, in the presence of co-propagating external point-source reference beam that samples the wave front errors along the path, as viewed through a telescope. A Shack-Hartmann wave front error sensor measures the phase aberrations encountered by the propagating beam.
Figure 2B:
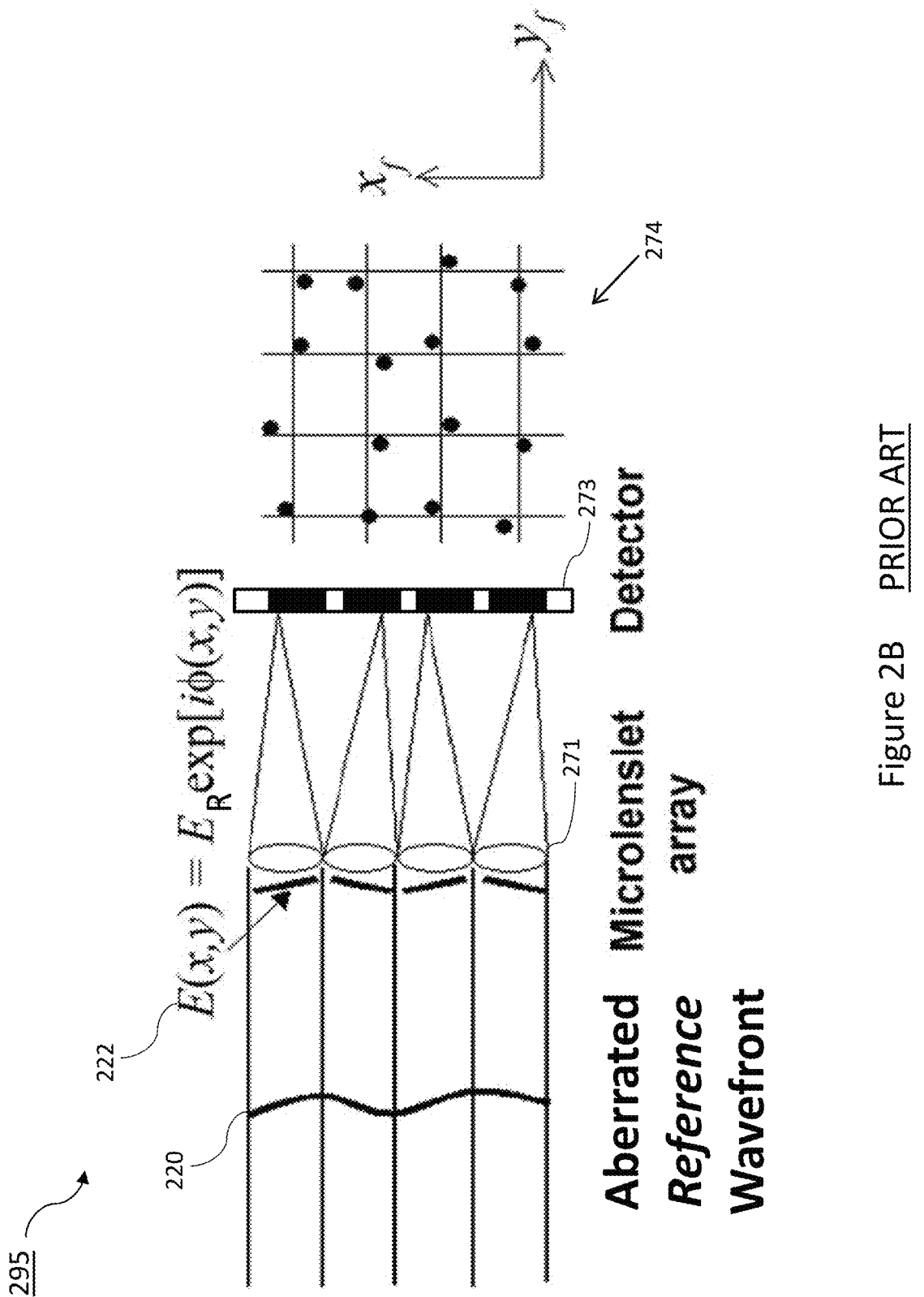
FIG. 2B depicts a prior art Shack-Hartmann wave front-error-sensor system, for the case of an incident aberrated reference beam, showing an array of microlenses that focus the beamlets onto a detector array.
Figure 2C:
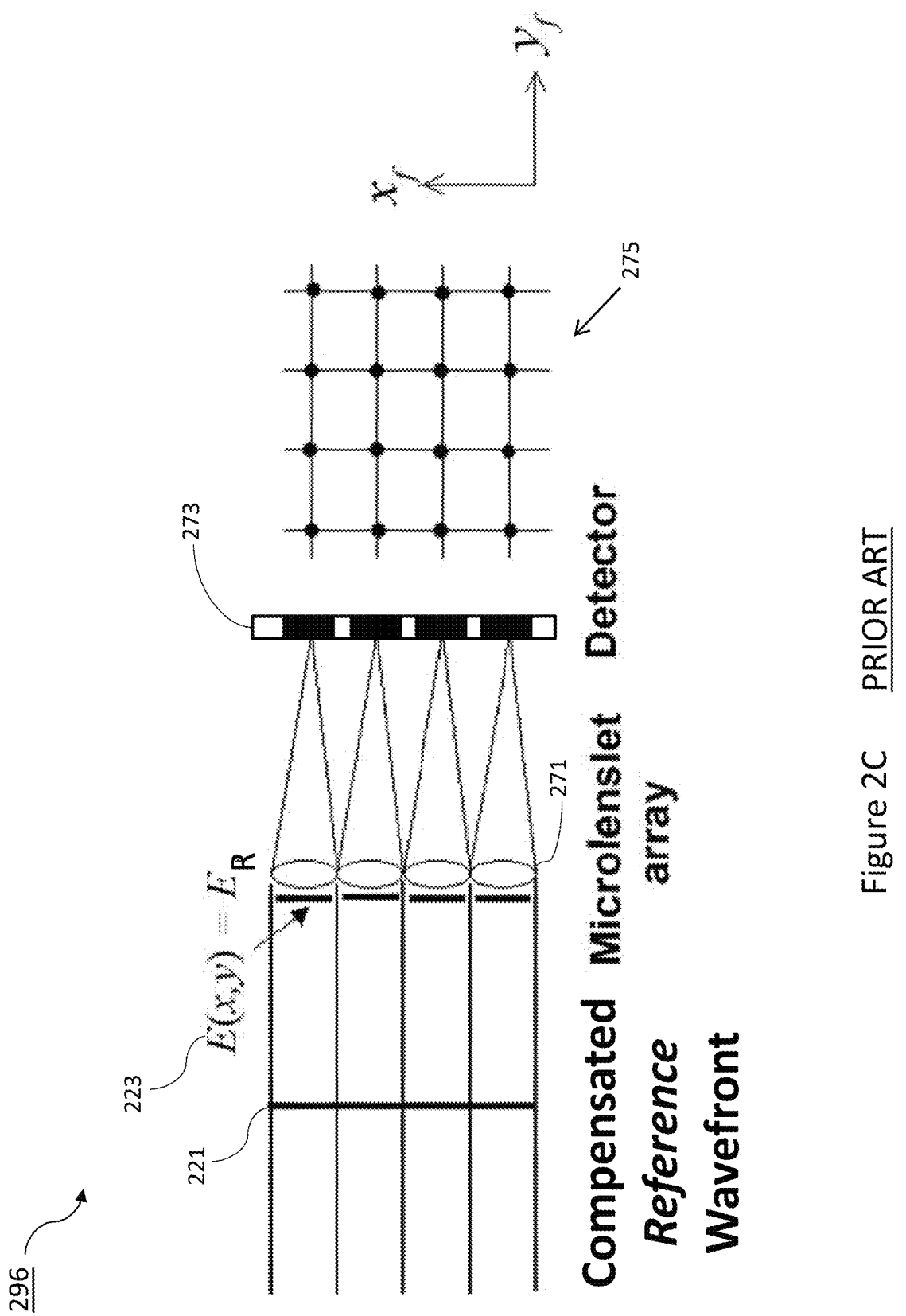
FIG. 2C depicts a prior art Shack-Hartmann wave front-error-sensor system, for the case of a compensated (unaberrated) reference beam, showing the beamlets focused onto a detector array.

It is important to note that the embodiment of FIG. 5 may appear counter-intuitive to one skilled in the art, upon examination of FIG. 2A. This follows, since, in the prior art of compensated imaging systems (e.g., FIG. 2A), a diffraction-limited beam typically, a laser, glint or guide star (recall FIG. 2A, 210), samples the propagation distortions through which an image-bearing beam (205) co-propagates. The compensation system senses wave front errors imposed by the atmosphere onto the received coherent reference beam. This information is utilized to control wave front-compensation elements (e.g., tip-tilt and a spatial phase modulator), so that, upon convergence, the spatial distortions experienced by the reference beam are corrected, with the reference beam restored to its diffraction limit. Subsequently, an image-bearing beam (which can be illuminated by an incoherent source) co-propagates over the same path as the reference beam, emerging from the correction system as a compensated image of high fidelity (limited by the isoplanatic patch volume, etc.); see 290 of FIG. 5.

Returning to FIG. 5, the required reference beam and the coherent laser beam are both present, but now, with two key (counter-intuitive) differences with respect to the conventional art of FIG. 2A. First, it is seen from FIG. 5 that the image-bearing beam (306) and optical source beam (584) are arranged to propagate in opposition to each another. That is, the pair of beams counter-propagates with respect to each other: One beam, the image-bearing beam 306, propagates, through the path distortions, from the object 505 to the compensation system, otherwise known as the down-link (recall 410 from FIG. 4). The other beam, 584, propagates from the telescope, upon reverse transit, back to the object, otherwise known as the up-link (recall 430 from FIG. 4). Both beams experience the same path distortions, but, from opposite directions.

The second key difference of FIG. 5 with respect to the prior art (FIG. 2A) is that the effective "roles" of the reference and image-bearing beams are essentially interchanged with respect to each other, relative to conventional image compensation systems. In the present embodiment, the effective point-source reference down-link beam of FIG. 2A (210) is, in FIG. 5, now in the form of the image-bearing down-link beam (306). And the image-bearing down-link beam of FIG. 2A (205) is, in FIG. 5, now in the form of an image-bearing up-link beam (584), the former simply an image to be compensated via the reference beam 205; the latter forming a reference itself, 306. These key differences are not obvious nor are they anticipated by those skilled in the art.

Moreover, the effective image-bearing beam of FIG. 2A is, in FIG. 5, now in the form of a diffraction-limited coherent laser beam, 593. In essence, referring to the down-link portion of the system (recall FIG. 4; 410), the image-bearing beam samples the path distortions, and, using the SB-WFS system, the wave front-control elements are configured to correct for the wave front distortions that are acquired by the image-bearing beam (306). The laser beam is then spatially encoded (596) by the compensation system and emerges in a direction directed back to the initial object, as a wave front reversed replica of the wave front distortions that were acquired by the incident, image-bearing beam.

In the prior art, on the other hand, upon convergence of the wave front correction elements, a laser beam (recall FIG. 1B, 175) is injected into the compensation system. This laser beam (assumed to be in a single spatial mode and diffraction-limited) is aligned to propagate in a direction counter to the incident image-beaming beam, that is, the up-link.

Figure 1B:
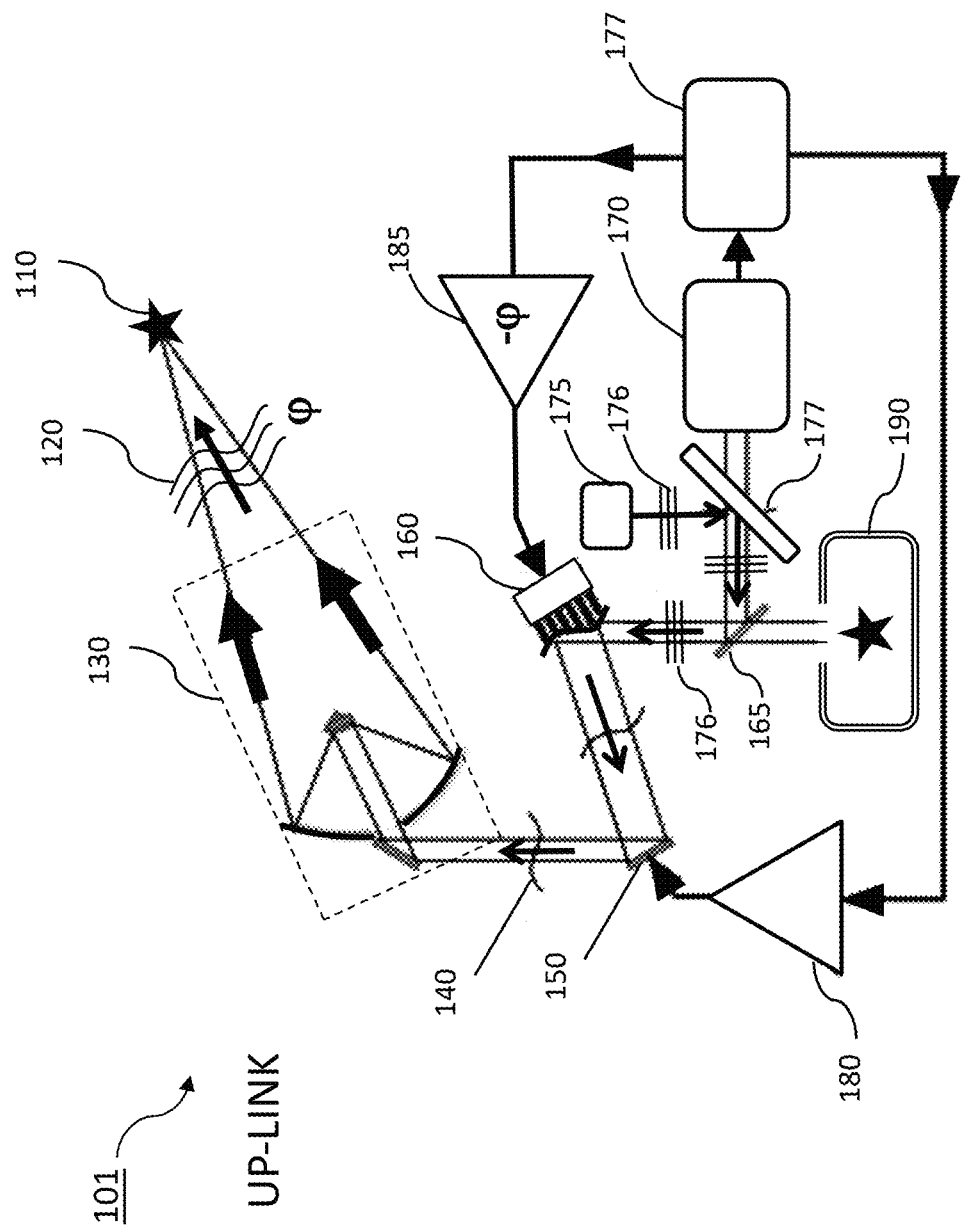
FIG. 1B depicts a prior art typical up-link adaptive optical communications system of the prior art, having the capability of compensating for dynamic wave front distortions encountered by an optical beam upon propagation through an atmospheric path, as viewed through a telescope or microscope.

Returning to FIG. 5, in the present invention, the laser readout beams differ fundamentally and is not anticipated with respect to the prior art, as shown in FIG. 1B. In the case of the prior art (FIG. 1B), the reference laser is a diffraction-limited plane wave, as shown in FIG. 1B, 175. That is, it is of uniform intensity, free of any spatial phase or amplitude information. In the present case, the communications laser is spatially encoded with the compensated image (599), as encoded by spatial modulator 576, which is counter to what is taught in the prior art.

In the prior art, in fact, by imposing any spatial amplitude information onto the communications laser of FIG. 1B, 175, the system would not result in a diffraction-limited beam back at the location of the glint and render the prior art ineffective or useless. Similarly, by not encoding the communications light source with image-bearing information, as in the present invention (FIG. 5; 596), the present invention would not result in a diffraction-limited beam 584 that illuminates the extended object, 505.

Returning to FIG. 5, the reverse-propagating light beam will then form at the object location as a diffraction-limited, image-bearing beam. This embodiment can be used to establish a high-performance simplex or duplex communications link between the object and the location of the compensation system, via a spatio-temporal modulation impressed upon one of both beams in the system: e.g., temporal modulation of the illumination beam at the object; and/or modulation of the communication light source at the location of the compensation device. Light from the object that propagates back to the compensation system 500 can be detected, after wave front compensation by elements 350 and 360, using conventional coherent or incoherent detection techniques for duplex communication requirements, as required.

Another class of application can employ a high-energy or a high-peak-power laser or laser amplifier chain (593) at the compensator location, which can be used to deliver sufficient optical flux at the object for materials processing, medical applications or directed energy applications, etc.

Since the light beam 584 is aligned using the now-compensated image as an effective spatial and angular fiducial marker, it is clear that the light beam will always reside within the isoplanatic volume, as defined by the path distortions, etc. Hence, the light beam will always be spatially encoded by the system as the intended wave front-reversed replica.

Note that the illuminated object can be in the form of a single target or a multitude of targets in space in a directed energy application, such as a group of weld joints in a manufacturing application or kidney stones, cancerous lesions or tooth cavities in a medical application, directed energy for solar panel remote powering, etc. In these cases, the return laser beam, upon reverse transit through the system can be amplified (e.g., Raman amplifiers, fiber amplifiers, etc.) for various applications. Other applications follow by those skilled in the art. Moreover, the optical system can be in the form of a space-based telescope, a microscope or an optical fiber, dependent upon the application design rules.

Vibrometers are well-known in the art. However, in this embodiment, the performance is enhanced in that the entire object is illuminated by a single diffraction-limited image-bearing beam, as generated at the remote location of the optical transceiver. Thus, whole-body illumination of the object is realized by a single beam, the output of the telescope 584. This is opposed to the prior art, which requires a plurality of beams, vibrometers or multiple fibers. The present invention has application to enhancing the performance of various remote sensing scenarios, including, as an example, manufacturing real-time process-control sensors, (time-dependent) long standoff distance vibration sensing with application to geo-physical mapping in the petroleum and defense sectors, target identification by detecting passive, vibrating target information, medical non-contact diagnostics, and various laser-based ultrasound applications.

Note also, that this vibrational information is realized by illuminating the entire object within to FOV with a single laser beam, does not require any fixture attached to the object. Moreover, the resolution is diffraction limited; that is, the effective number of interrogated pixels is limited by diffraction and is not limited by a finite number of laser vibrometers, as is the case with the prior art. Furthermore, the present invention compensates for path distortions. This is opposed to the prior art, which required a finite ensemble of independent laser vibrometers, attached to a fixture at a fixed standoff distance from the object and, moreover, the prior art system does not compensate for path distortions.

The present invention can be classified as a reference-free, path-compensated, adaptive optical, conformal imaging laser Doppler vibrometer (CI-LDV) using scene-based wave front sensing (SB-WFS).

Turning now to FIG. 6, details of an exemplary embodiment are shown that enables the system 600 to function as a path-compensated, conformal imaging adaptive laser Doppler vibrometer, capable of providing temporal and spatial information as to the whole-body or local vibrational modes of an extended object, 605.

Relative to the embodiment of FIG. 5, the present embodiment provides the added capability of enabling transparent or translucent objects to be probed. As such, the object can now be illuminated (601) in transmission or reflection. Moreover, the initial illumination source (601 or 963) can be coherent (e.g., a laser) or incoherent (e.g., sunlight, LED arrays, etc.). Note that, as opposed to the prior art, only a single illumination beam is required to illuminate extended object. Examples of objects to be evaluated include biological samples, plastic objects, thin film structures, semiconductor devices, automotive work pieces, airplane components, or a collection of independently vibrating objects, such as multi-pixel MEMS devices, etc.

The basic approach employs Zernike interferometry (Zernike phase-contrast microscopy) as a broadband 2-d phase detection modality, in conjunction with reference-free, scene-based adaptive optical compensation of propagation distortions. Given the Zernike interferometric approach, in the present case, the object can now be illuminated by an incoherent (in addition to a coherent) source.

This embodiment provides two remote sensing modalities, each without the need of a coherent reference beam: (1) a path-compensated Zernike image of the object, e.g., a phase-to-intensity mapping of a transparent object; and (2) a path-compensated heterodyne 2-d interferogram of the vibrating object.

As described below, path distortions (atmospheric turbulence, etc.) are compensated by the object beam itself. Hence, the Zernike interferometer outputs are those of a compensated phase-to-intensity mapped image, free of path distortions, and without the need of an auxiliary reference beam (e.g., a laser, glint, guide star, etc.).

Recall that this class of vibrometer functions across the entire object with a single illumination beam (limited by the FOV of the system), as opposed to the prior art, the latter of which requires a plurality of beams as point sources to illuminate multiple points along the surface of an object.

As is the case in FIG. 5, extended regions of an object or a multitude of objects, each with different acoustic or ultrasound signatures, can be illuminated by a single beam, the regions of which can be controlled by varying the FOV of the telescope (or microscope). Moreover, this class of vibrometer compensates for dynamic atmospheric distortions in long-haul scenarios as well as short standoff distances typical of manufacturing or medical environments (the prior art for extended objects and multi-pint interrogation requires a fixed standoff distance and a plurality of vibrometers, fibers or lasers, and does not compensate for static or dynamic path distortions).

A flow chart depicting this embodiment is shown in FIG. 4. The details of this embodiment's flow chart are similar to that described in FIG. 4, with respect to the embodiment of FIG. 5, with the following differences:

The descriptors in 422, 440 and 441 now refer to Zernike images and Zernike interferometry.

In addition, the algebraic field descriptions in the flow chart [$E(x,t)$ and $Io(x,t)$], are similar to those earlier referenced with respect to FIG. 4, except now, the functions are typically complex functions, since the object and images can be transparent (or translucent) and hence contain phase factors in general.

Referring to FIGS. 4 and 6, the output of the Zernike interferometers is detected in two different ways:

In one case, a path-compensated Zernike image of the phase map corresponding to the object is obtained, as depicted in the flow chart of FIG. 4, callout 441 and FIG. 6, callout 699.

In the other case, a path-compensated, coherently detected heterodyne, 2-d spatio-temporal Zernike interferogram of the vibrating object is obtained, as depicted in the flow chart of FIG. 4, callout 444 and FIG. 6, callout 698.

In the former case, this operation is accomplished using an incoherent (or coherent) illumination beam and direct detection of the transparent object. Thus, a reference-free adaptive optical compensated Zernike image 699 is realized, free of path distortions.

In the latter case, the operation is accomplished using an incoherent (or coherent) illumination beam to realize spatially dependent mapping of a vibrating object via 2-d mapping of the vibrations 698. In the case of heterodyne detection, the vibrations of the object are equivalent to a 2-d set of phase modulators across the object, which can be viewed as a conformal imaging laser Doppler vibrometer (CI-LDV) with reference-free compensation of path distortions.

In this embodiment, 2-d mapping is realized using a high-speed, high-resolution video detector (e.g., a ccd) 678, with its video output incident upon a multi-channel analyzer 679, thereby revealing whole-body or local vibrations of the transparent object, or constellation of multiple transparent objects, 698.

Since the system provides scene-based wave front sensing, the system provides for adaptive optical functionality, and path distortions are also compensated, again, using only the image-bearing beam for wave front sensing and reconstruction.

Referring back to the flow chart of FIG. 4, it is assumed that the object beam 411 traverses a general turbulent atmosphere (413 and 426) between it and the transceiver, 414 and 425. The basic operations of the down-link 410 and the up-link 430 follow those of FIG. 4; recall 410 and 430, and the algebraic expressions of the field at each system function.

In the case of a general object (amplitude and phase), it is to be understood that the illuminated object field is given as $E(x,t)=Io(x,t)$, where $Io(x,t,)$ is a complex function of x and t. In the case of a phase-only object (e.g., biological samples, transparent or translucent plastic objects), it is to be understood that the illuminated object field is given as $E(x,t)=Io(x,t)$, where $Io(x,t,)$ is a purely imaginary function of x and t.

Turning now to FIG. 6, details of an exemplary embodiment is shown 600 that enables a SB-WFS adaptive optical system, in conjunction with a Zernike detector, to receive an imaging-bearing beam, compensate for path distortions and to provide spatio-temporal information due to a static (via 699) or vibrating transparent object (698). In either case, an adaptive optical, path-compensated Zernike phase contrast image is obtained for the object 605. In the latter case, a vibration spectrum is provided, as well as a vibration mapping of the vibrational modes at the surface of the object, resulting in an effective adaptive optical, path-compensated conformal image laser Doppler vibrometer (CI-LDV), without the need for a finite array of vibrometers. The effective number of vibrometers in this embodiment is given by the diffraction limit of the imaging system, which can exceed a finite number of vibrometer by orders of magnitude along each dimension, the latter, the case of the prior art.

In the system 600 a vibrating object 605 is illuminated by an external source (601), which can be a coherent source (e.g., a laser) or an incoherent source (e.g., sunlight, LEDs, etc.) or by the laser in the transceiver, 693. The spatio-temporal vibrations are represented by a spatial phase modulator 607 driven by a spatio-temporal signal 682 $[M_D(x,t)]$ across the object as a whole-body vibration or as a multitude of vibrational modes of a transparent object or constellation of transparent objects 605.

The goal is two-fold: (1) to obtain a Zernike image of the object 601; and (2) to obtain a spatial mapping of the vibrations of the object, 682, $M_D(x,t)$, the latter via Zernike dynamic interferometry.

The beam transmitted or reflected by the object emerges as beam 606, which propagates through the atmospheric phase distortions 320, The modulated signal image-bearing signal 606 encounters a spatially and temporally dependent path distortion 320, represented by the phase factor PHI=PHI(x,t), and is incident upon a vibrometer transceiver, comprised of a telescope (or microscope), represented by lenses 330 and 345, and a closed-loop scene-based adaptive optical system, as described with reference to FIG. 5.

Note that these embodiments and specific descriptions are similar to those of FIG. 5, except, now, as opposed to imaging of an opaque object and its vibrational modes, a Zernike image of transparent or opaque object(s) and its vibrational modes can be processed, as described in the flow chart of FIG. 4 and in what follows herein. The system provides a compensated video image of the Zernike image output 699, as well as a pixelated vibrational mapping 698 of the modes [signal $M_D(x,t)$] of the object 605.

In what follows, we succinctly cover the salient points of this embodiment. Other details and descriptions are similar to those in FIG. 5.

For heuristic considerations, two Zernike interferometers are shown in FIG. 6: one to generate the compensated Zernike image (690) of the object and another to generate the dynamic Zernike interferogram (678). It is to be understood that these two Zernike functions can, in principle, be integrated into a single Zernike interferometer using existing art optical design rules (subject to differences in the functionality of the two interferometers).

Each Zernike interferometer shown in FIG. 6, is represented by a pair of lenses, with a Zernike plate located at its common focus: The first Zernike interferometer is comprised of lenses 647 and 695, with Zernike phase plate (schematically represented by) 658 at its common focus. The second Zernike interferometer is comprised of lenses 677 and 686, with Zernike plate (schematically represented by) 659 at its common focus.

One version of a Zernike plate is comprised is a transparent substrate, with its central region (e.g., a dimple) phase shifted by ¼ of a nominal optical wave, relative to the substrate, as is known in the art. Hence, as is known in the art, the Zernike interferometer can function in the face of a broadband optical input.

In general, the dimple diameter, d, is typically given by the Airy disc diameter. Note also that Zernike interferometers can also be formed using annular phase plates as is known in the art. The phase plates in the figure are therefore representations of a general Zernike interferometer for ease of viewing in the figure. In the present invention, the "effective" diameter, d, of the phase-shifting region is controlled by a servo system (not explicitly shown; as controlled by processor 692 and 678) the function of which is to optimize the contrast ratio (among other parameters and such parameters as the signal-to-noise) of the Zernike interferometer output.

Returning to FIG. 6, spectral filter 379 can be specified to realize a narrow spectral response, as deemed necessary. The spectral response of filter 379 can be controlled by a feedback loop (not shown) with control parameters determined by processors 377, 692 and 678 to optimize the signal-to-noise figure of the Zernike output. In addition, a polarizer 665 can be placed in the telescope system to define a fixed optical polarization in the receiver to maximize the fringe visibility of the Zernike output (both for the image 690 and for the 2-d heterodyne detector 698).

The image bearing beam 606 is incident upon beam splitter 365. The transmitted beam 366, in turn, is incident upon scene-based WFS 370 and wave front inverted computational reconstructor 377 that drives tip-tilt compensator (otherwise known as a fast steering mirror) 350 and inverted wave front $SLM_2$ 360 via respective drivers 380 and 381. This forms a closed-loop, scene-based adaptive optical subsystem which, upon convergence, compensates for wavefront distortions 320.

The now-compensated beam 667 reflected by beam splitter 365 is subsequently reflected by beam splitter 591, emerging as beam 608, which is incident upon Zernike plate 658. The Zernike output beam 608 (formed by lenses 647, 695 and phase plate 658), is collimated by lens 695 and is incident upon video camera 690. The video output 694 of camera 690 is that of a compensated Zernike interferometric mapping of the image-bearing phase object(s), 605. The video output 694 is processed by 692 (e.g., contrast enhancement, edge detection, etc.) whose video output is directed by 672 for viewing of the transparent object in the form of an intensity pattern 699, which is to be compared against the output of the Zernike coherent beam output (spatial vibrational spectrum) 698 to be discussed below. Details of the comparison of processor 679 are typical of image processing algorithms, as is known in the art.

Another video output of 692, 697, is directed to $SLM_1$ 696 to spatially encode the laser beam 643 with the compensated Zernike spatial information, indicative of that of the object 605, emerging as beam 684. (Details of the laser 693, beam 643, Faraday isolator 641, and beam splitter 640 are similar to corresponding elements of FIG. 5.)

As is the case with respect to FIG. 5, in the present case, $SLM_1$ 696 and $SLM_2$ 360 each perform different functions, each with different design parameters: $SLM_1$ 696 encodes image-bearing information (in the form of a Zernike output 697) onto the reverse transit beam 684, whose spatial resolution matches that of the object 605, subject to Nyquist conditions (on the order of 1,000 to 10,000 pixels along each dimension).

On the other hand, $SLM_2$ 360 encodes inverted wave front information (–PHI) onto beam 684, whose spatial resolution matches that of the propagation distortion 320 (on the order of 10 to 100 pixels in each dimension, subject to the Nyquist conditions).

Returning to FIG. 6, upon encoding beam 643 with $SLM_1$ 696, beam 684 is directed into a reverse direction relative to beam 667 for reverse transit through the inverted wave front encoding $SLM_2$ 360 and tip-tilt compensator 350.

The beam 684 emerging from the vibrometer $[E(x,t,)=Io(x,t)exp(-iPHI)]$ then propagates in a counter-propagating direction with respect to the initial image bearing beam 606, then, through the path distortion 320 [exp (+iPHI)], emerging as a compensated wave front image-bearing beam 684 $[E(x,t,)=Io(x,t)]$, which is then incident upon object 605 thereby illuminating the object with a diffraction-limited image. The sequence subsequently repeats for a following iteration through the system, via path 428 (recall, FIG. 4).

Returning to FIG. 6, a fraction of the compensated image-bearing beam 667 reflects from beam splitter 574 as beam 683, which is incident upon a second Zernike interferometer, comprised of phase plate 659, bounded by lenses 647 and 686. The output of this second Zernike is collimated and is incident upon a high-resolution, high-speed, large-area 2-d video camera (e.g., a high-speed ccd) 678. The output of this second Zernike interferometer from lens 686 is incident upon a large-area video camera (e.g., a high-speed ccd) 678.

Also, incident upon camera 678 is a local oscillator beam 689 (shown as dashed lines in FIG. 6). The local oscillator is similar to that described in FIG. 5, and, in this case, 673 (in the form of a Bragg grating, acousto-optical modulator or equivalent) generates the frequency offset for the local oscillator beam 689. Recall that laser 693 beam 643 propagates through Faraday isolator 641 and reflects off beam splitter 640 as beam 689. The Faraday isolators prevent spurious reflections from destabilizing the laser 693. The local oscillator beam 689 (dashed lines) is then incident upon a Zernike interferometer, formed by lenses 677 and 686 with Zernike phase plate, represented by 659 (Note that local oscillator beam 689 can also be coupled onto detector 678 using beam splitters downstream of lens 686, as deemed necessary.) The beam waist of the local oscillator beam 689 is greater than that of signal beam 683 to assure overlap of the signal beam across the entire coherent detector active area of 678.

This output 698 corresponds to a high-speed interferogram of the spatial vibrational modes of the object, which can be superimposed on a compensated image 699 for comparative reasons of the illuminated object 605 and modulation information 682.

A multi-channel processor 679 yields the surface vibrations, accelerations or displacements from the illuminated object 605 at each spatially resolvable location, within the FOV of the telescope system lenses 330, 345 and 347. The resultant data can be compared to the compensated image 699 for a detailed mapping analysis. Conventional image processing algorithms can also be implemented for this operation, as is known in the art. The pixelated mapping of the vibrational modes is given by signal 698 $M_D(x,t)$. This system is equivalent to an adaptive optical, reference-free, compensated, conformal-imaging laser Doppler vibrometer (CI-LDV) using a scene-based WFS.

As opposed to the prior art, the path distortions are compensated, the object can be illuminated by a single (coherent or incoherent) beam, independent of standoff distances and the vibrations are revealed at pixel locations determined by the number of diffraction-limited pixels across the surface and not by a finite number of laser vibrometers (and associated fixtures), the latter constraint of which is in the prior art.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated.

As an example, the system can be used to service other portions of the spectrum, from the ultraviolet to the infrared to mm wave and below, with application to radars, hyperspectral imaging, among others. Dual-conjugate optical systems can be implemented to simultaneously correct for near-field aberrations (e.g., turbulent boundary layers) and far-field aberrations (e.g., distributed atmospheric turbulence). Moreover, different classes of wave front-error sensors can be used in place of the Shack-Hartmann WFS, such as a pyramid WFS. Furthermore, acoustic analogs of this system can be realized, with application to medical and nondestructive evaluation of materials, among others.

It is to be appreciated that the compensated optical imaging system can be implemented to service a variety of imaging-based applications beyond atmospheric viewing systems. Hence, when the basic imaging system is referred to as a telescope, it is to be understood that the present teachings and embodiments can also be applied, without loss of generality, to compensated microscopy systems, speckle imaging, ophthalmological systems, communications systems, and the distortion path is referred to as a dynamic atmosphere, ultrasound imaging systems and so on. Moreover, optical reflective as well as optical transmissive elements can be implemented in the above-mentioned embodiments.

Similarly, when the distortion path that imposed the wave front distortions to be compensated is referred to as a dynamic atmosphere, it is to be understood that the teachings can also be applied, without loss of generality, to a correct for propagation-path distortions such as those experienced by imperfect optical elements, and static and/or dynamic distortions due to propagation through, or scattered from, ocular systems, skin tissue, clouds, turbid liquids, industrial environments, and so on. The scene-based (Shack-Hartmann) wave-front sensor could also be used in a postprocessing scheme such as deconvolution or to augment speckle imaging.

It is also understood that the teachings herein can apply to guided-wave implementations of the present invention, given the state-of-the-art in optical fiber devices including, but not limited to, modulators, Faraday rotators and isolators, polarizers, sensors, fiber couplers and splitters, photonic crystal fibers, holey fibers, diode-pumped fiber lasers, amplifiers, Raman fiber amplifiers and MEMS devices. Fiber realizations can also be employed in place of bulk optical elements.

Furthermore, it is also to be understood that the teachings described herein can also enable reference-free compensated imaging and beam delivery for systems that operate in other regions of the electro-magnetic spectrum. As an example, precision compensated imaging over propagation-path distortions in the THz regime can be realized by employing appropriate THz detectors, sources, and beam forming components (THz sensors, imagers, diffraction gratings, photonic crystals, modulators, etc.) analogous to those in the optical embodiments. In addition, it is to be appreciated that the extension of the techniques taught herein can also apply to acoustic and ultrasonic reference-free imaging and beam forming systems through acoustic-based distortion paths.

The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation.

The scope of the invention is to be defined by the following claims.

What is claimed is:

1. A method for conformal imaging vibrometry of a vibrating object, with adaptive optical compensation of optical propagation distortions, using scene-based wavefront error sensing, comprising:

directing a first laser to illuminate the said vibrating object to produce a reflected, first scene-based optical reference down-link beam, having a first image-bearing wavefront and having a first image-bearing amplitude, both characteristic of a surface of the said vibrating object and, further, both having a modulation representative of a motion of the said vibrating object;

propagating the said first scene-based optical reference down-link beam through an optical path, comprised of the said optical propagation distortions, with the said first scene-based optical reference down-link beam acquiring said optical propagation distortions, upon propagation through the said optical propagation distortions, imposed onto the said first image-bearing wavefront and, further, imposed onto the said first image-bearing amplitude of the first scene-based optical reference down-link beam, producing an optically distorted first scene-based optical reference down-link beam;

receiving the said optically distorted first scene-based optical reference down-link beam with a receiver, comprised of an optical telescope, an adaptive optical system, a first spatial light modulator, a second spatial light modulator, an optical frequency shifter, a first 2-d video detector, a second 2-d video detector, a second laser and a multi-channel analyzer;

compensating for the said optical propagation distortions imposed onto the said first scene-based optical reference down-link beam, upon propagation of the said optically distorted first scene-based optical reference down-link beam through the said adaptive optical system, wherein the said adaptive optical system comprises a scene-based wavefront error sensor, a scene-based wavefront reconstructor, a wavefront inversion driver, a tip-tilt compensator and the said first spatial light modulator, wherein the said first spatial light modulator further comprises a phase-only, optical read-out capability;

encoding an input of the said first spatial light modulator with an optically distorted first image-bearing inverted wavefront signal, derived from the said wavefront inversion driver;

generating a distortion-free, first scene-based optical reference down-link beam replica, derived from an output of the said adaptive optic system, wherein the said distortion-free, first scene-based optical reference down-link beam replica comprises a distortion-free, first image-bearing wavefront and, further, comprises a distortion-free, first image-bearing amplitude;

detecting the said distortion-free, first scene-based optical reference down-link beam replica with the said first 2-d video detector;

generating a directly detected, first 2-d video output signal from an output of the first 2-d video detector, comprising the said distortion-free, first image-bearing amplitude of the said vibrating object;

encoding an input of the second spatial light modulator, having an amplitude-only optical readout capability, with the directly detected, said first 2-d video output signal;

generating a directly detected, first 2-d pixelated map from the output of the first 2-d video detector, comprising the said distortion-free, first image-bearing amplitude of the said vibrating object;

generating a first local oscillator beam within the said receiver, using the said second laser, comprising a single-spatial mode output, and, further, propagating in a substantially reverse direction relative to the said received, optically distorted, first scene-based optical reference down-link beam;

generating a distortion-free, amplitude-encoded optical replica of the said first scene-based optical reference down-link beam, propagating in a substantially reverse direction relative to the said received, optically distorted, first scene-based optical reference down-link beam, by reading out an output of the second spatial light modulator with the said first local oscillator beam;

generating a scene-based optical reference up-link beam by reading out an output of the said first spatial light modulator with the said distortion-free, amplitude-encoded optical replica of the said first scene-based optical reference down-link beam, propagating in a substantially reverse direction relative to the said received, optically distorted, first scene-based optical reference down-link beam, thereby generating the said scene-based optical reference up-link beam, comprised of the said optically distorted, image bearing inverted wavefront, wherein the said optically distorted, image-bearing inverted wavefront is spatially modulated by the said distortion-free, amplitude-encoded first local oscillator beam;

transmitting the said scene-based optical reference up-link beam, emerging from the said telescope, and, subsequently, emerging from the said receiver, propagating in a substantially reverse direction, relative to the said received, optically distorted, first scene-based optical reference down-link beam;

compensating for the said optical propagation distortions imposed onto the said scene-based optical reference up-link beam, upon reverse transit and propagation of the said scene-based optical reference up-link beam through the said optical propagation distortions, generating a distortion-free, diffraction-limited, first scene-based optical reference down-link beam replica at the said surface of the said vibrating object, having a first image-bearing wavefront free of the said optical propagation distortions, and, further, having a first image-bearing amplitude free of the said optical propagation distortions, both characteristic of the said surface of the said vibrating object;

illuminating the surface of the said vibrating object with the said distortion-free, diffraction-limited, first scene-based optical reference down-link beam replica;

generating a second scene-based optical reference down-link beam upon reflection of the said distortion-free, diffraction-limited, first scene-based optical reference down-link beam replica by the said vibrating object, with the said second scene-based optical reference down-link beam having a second image-bearing wavefront and having a second image-bearing amplitude, both characteristic of the said surface of the said vibrating object and, further, both having the said modulation representative of the said motion of the said vibrating object;

generating a frequency-shifted, second local oscillator beam within the said receiver, upon propagation of a first local oscillator beam through the said optical frequency shifter;

combining the said distortion-free, first scene-based optical reference down-link beam replica with the said frequency-shifted second local oscillator beam, at the input of the said second 2-d video detector, thereby coherently generating a second 2-d pixelated map signal, comprised of the said vibrational modes of the said vibrating object;

directing the said second 2-d pixelated map signal into the said multi-channel analyzer, thereby generating a third 2-d pixelated map, comprised of the said vibrational modes of the said vibrating object; and comparing the said directly detected, first 2-d pixelated map, comprising the said, distortion-free image of the said vibrating object with the third 2-d pixelated map, comprising the said vibrational modes of the said vibrating object for analysis;

creating an effective optical communications link comprised of the said vibrating object, located at one end of the said effective optical communications link, and the said receiver located at the distal end of the said effective optical communications link;

generating a stable conformal imaging vibrometer output from the said receiver, upon convergence of the said effective optical communications link, with adaptive compensation of the said optical propagation distortions, using the said scene-based wavefront error sensing.

2. The method of claim 1, wherein the said optical communications link is comprises an optical vibrometer with a first laser beam and a second laser beam.

3. The method of claim 1, wherein generating the said coherently detected 2-d video signal comprises heterodyne detection.

4. The method of claim 1, wherein generating the said coherently detected 2-d video signal comprises homodyne detection.

5. The method of claim 1, wherein said spatial light modulators are comprised of MEMS-based spatial light modulators.

6. The method of claim 1 further comprises placing a Zernike phase contrast interferometer, with a 90° phase shifting feature, is employed immediately upstream of the said 2-d video direct detection video detector, and, further, wherein the said Zernike phase contrast interferometer comprises a 2-lens optical system, having a common focal plane and having a common optical axis, and, further, placing a 90° phase shifting optical element, having a diameter, positioned at the said common focal plane, along the said common optical axis, with the said diameter equal to a diffraction-limited beam spot size of the said incident optical beam.

7. The method of claim 6, wherein the said 90° Zernike phase shifting optical element feature possesses a controllable diameter, and, further, wherein the said controllable diameter is servo controlled to maximize the phase 2-d intensity contrast output of the said Zernike phase contrast interferometer placed upstream of the said 2-d video direct detection detector.

8. The method of claim 1 further comprises placing a Zernike phase contrast interferometer, with a 90° phase shifting feature, is employed immediately upstream of the said 2-d video coherent detection video detector, and, further, wherein the said Zernike phase contrast interferometer comprises a 2-lens optical system, having a common focal plane and having a common optical axis, and, further, placing a 90° phase shifting optical element, having a diameter, positioned at the said common focal plane, along the said common optical axis, with the said diameter equal to a diffraction-limited beam spot size of the said incident optical beam.

9. The method of claim 8, wherein the said 90° Zernike phase shifting optical element feature possesses a controllable diameter, and, further, wherein the said controllable diameter is servo controlled to maximize the phase 2-d intensity contrast output of the said Zernike phase contrast interferometer placed upstream of the said 2-d video coherent detection detector.

* * * * *